US012685238B2

(12) United States Patent
Beaujot

(10) Patent No.: US 12,685,238 B2
(45) Date of Patent: Jul. 21, 2026

(54) UNIDIRECTIONAL IMPLEMENT OPERATING APPARATUS

(71) Applicant: DOT Technology Corp., Emerald Park (CA)

(72) Inventor: Norbert Beaujot, Emerald Park (CA)

(73) Assignee: DOT Technology Corp., Emerald Park (CA)

( * ) Notice: Subject to any disclaimer, the term of this patent is extended or adjusted under 35 U.S.C. 154(b) by 958 days.

(21) Appl. No.: 17/635,668

(22) PCT Filed: Aug. 14, 2020

(86) PCT No.: PCT/CA2020/051122
§ 371 (c)(1),
(2) Date: Aug. 8, 2022

(87) PCT Pub. No.: WO2021/030904
PCT Pub. Date: Feb. 25, 2021

(65) Prior Publication Data
US 2022/0287214 A1 Sep. 15, 2022

(30) Foreign Application Priority Data
Aug. 16, 2019 (CA) .................................... 3 052 153

(51) Int. Cl.
*A01B 51/02* (2006.01)
*A01B 63/00* (2006.01)
*A01B 63/10* (2006.01)

(52) U.S. Cl.
CPC .......... *A01B 51/026* (2013.01); *A01B 63/002* (2013.01); *A01B 63/1006* (2013.01)

(58) Field of Classification Search
CPC ....... A01B 51/02; A01B 51/026; A01B 45/02; A01B 67/00; A01B 73/005; A01B 63/002;
(Continued)

(56) References Cited

U.S. PATENT DOCUMENTS 2,696,928 A 12/1954 Faircloth et al.
3,677,572 A 7/1972 Fontan et al.
(Continued)

FOREIGN PATENT DOCUMENTS

CA 2964610 A1 10/2017
CA 3052153 A1 2/2021
(Continued)

OTHER PUBLICATIONS

"Canadian Application Serial No. 3,052,153, Examiners Rule 86(2) Report mailed Sep. 21, 2023", 3 pgs.
(Continued)

*Primary Examiner* — Joseph M Rocca
*Assistant Examiner* — Robert E Pezzuto
(74) *Attorney, Agent, or Firm* — Schwegman Lundberg & Woessner, P.A.

(57) ABSTRACT

A U-shaped drive frame has a base beam and parallel side beams defining an open implement area. Drive wheels support the side beams, and each drive wheel rotates about a horizontal drive wheel axis perpendicular to the operating travel direction. A steering control steers the drive frame in the operating travel direction. Implements are configured to perform implement operations and to rest on the ground surface when in an idle position. The drive frame moves rearward to a loading position where each implement is movable to an operating position supported by the drive frame. Each implement provides a beam lock connection between the side beams that resists twisting movement of the side beams to maintain the drive wheels and the side beams in a substantially fixed relationship with respect to each other.

37 Claims, 16 Drawing Sheets

(58) Field of Classification Search

CPC . A01B 63/1006; A01B 69/006; A01B 69/008; B62D 21/14; B60D 1/46; B60P 1/52

See application file for complete search history.

(56) References Cited

U.S. PATENT DOCUMENTS

| | | | |
|---|---|---|---|
| 3,985,185 | A | 10/1976 | Pierce |
| 4,683,969 | A | 8/1987 | Littau |
| 4,958,978 | A | 9/1990 | Shedleski |
| 6,213,218 | B1 * | 4/2001 | Miller ................... A01B 51/026 |
| | | | 172/19 |
| 6,308,785 | B1 | 10/2001 | Rhoden |
| 7,549,279 | B2 * | 6/2009 | Merant ................ A01B 59/063 |
| | | | 56/330 |
| 8,515,594 | B2 * | 8/2013 | Perry ...................... B64F 1/227 |
| | | | 244/50 |
| 10,368,473 | B2 | 8/2019 | Treinen et al. |
| 2007/0157592 | A1 | 7/2007 | Merant et al. |
| 2011/0148053 | A1 | 6/2011 | Motebennur et al. |
| 2014/0216314 | A1 | 8/2014 | Bourgault et al. |
| 2017/0227969 | A1 | 8/2017 | Murray et al. |
| 2018/0153084 | A1 | 6/2018 | Calleija et al. |
| 2019/0053417 | A1 | 2/2019 | Beaujot |
| 2021/0245821 | A1 | 8/2021 | Crouzat |
| 2023/0389457 | A1 | 12/2023 | Beaujot et al. |

FOREIGN PATENT DOCUMENTS

| | | |
|---|---|---|
| EP | 1319587 | 6/2003 |
| EP | 3868190 | 8/2021 |
| EP | 4014100 A4 | 1/2024 |
| ES | 1265465 | 4/2021 |
| FR | 2678888 | 1/1993 |
| WO | WO-2021030904 A1 | 2/2021 |
| WO | 2023239807 | 12/2023 |

OTHER PUBLICATIONS

"European Application Serial No. 20855699.3, Extended European Search Report mailed Dec. 12, 2023", 13 pgs.

"Canadian Application Serial No. 3,052,153, Response filed Jan. 19, 2024 to Examiners Rule 86(2) Report mailed Sep. 21, 2023", 17 pgs.

"International Application Serial No. PCT/CA2020/051122, International Search Report mailed Oct. 9, 2020", 3 pgs.

"International Application Serial No. PCT/CA2020/051122, International Written Opinion mailed Oct. 9, 2020", 5 pgs.

U.S. Appl. No. 18/330,982, filed Jun. 7, 2023, Implement Operating Apparatus and Methods for Same.

"European Application Serial No. 20855699.3, Response to Communication pursuant to Rules 161(2) and 162 EPC filed Sep. 30, 2022", 39 pgs.

"European Application Serial No. 20855699.3, Communication Pursuant to Article 94(3) EPC mailed Aug. 4, 2023", 15 pgs.

"Application Serial No. 18 330,982, Preliminary Amendment Filed Aug. 22, 2023", 8 pgs.

"International Application Serial No. PCT US2023 024739, International Search Report mailed Sep. 1, 2023", 2 pgs.

"International Application Serial No. PCT US2023 024739, Written Opinion mailed Sep. 1, 2023", 9 pgs.

"U.S. Appl. No. 18/330,982, Non Final Office Action mailed Oct. 16, 2025", 11 pgs.

"Australian Application Serial No. 2020334396, First Examination Report mailed Feb. 18, 2025", 3 pgs.

"Brazil Application Serial No. BR112022002826-1, Office Action mailed Oct. 9, 2025", with manual English translation, 7 pages.

"Canadian Application Serial No. 3,052,153, Examiners Rule 86(2) Report mailed Jul. 29, 2024", 3 pgs.

"Canadian Application Serial No. 3,052,153, Response filed Jan. 22, 2025 to Examiners Rule 86(2) Report mailed 7-29-2", 18 pages.

"European Application Serial No. 20855699.3, Response filed Aug. 1, 2024 to Extended European Search Report mailed Dec. 12, 2023", 20 pgs.

"European Application Serial No. 21833446.4, Response to Communication Pursuant to Rules 161 and 162 EPC filed Jul. 14, 2025", 19 pgs.

"International Application Serial No. PCT/US2023/024739, International Preliminary Report on Patentability mailed Dec. 19, 2024", 11 pgs.

"Application Serial No. 18 330,982, Response filed Jan. 15, 2026 to Non Final Office Action mailed Oct. 16, 2025", 12 pages.

"Australian Application Serial No. 2020334396, Response filed Feb. 11, 2026 to First Examination Report mailed Feb. 18, 2025", 79 pages.

"Australian Application Serial No. 2020334396, Subsequent Examination Report mailed Feb. 12, 2026", 3 pages.

"Australian Application Serial No. 2020334396, Response filed Feb. 17, 2026 to Subsequent Examination Report mailed Feb. 12, 2026", 72 pages.

"European Application Serial No. 23820418.4, Communication pursuant to Rule 1641 EPC mailed May 11, 26", 13 pages.

* cited by examiner

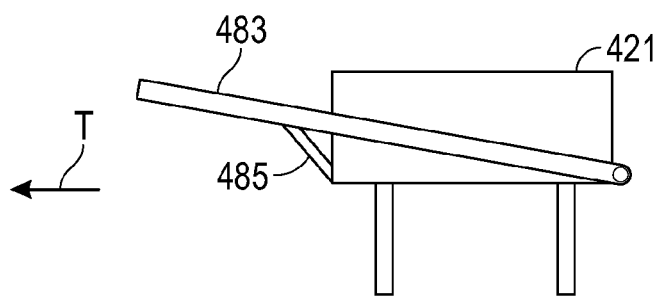
FIG. 21
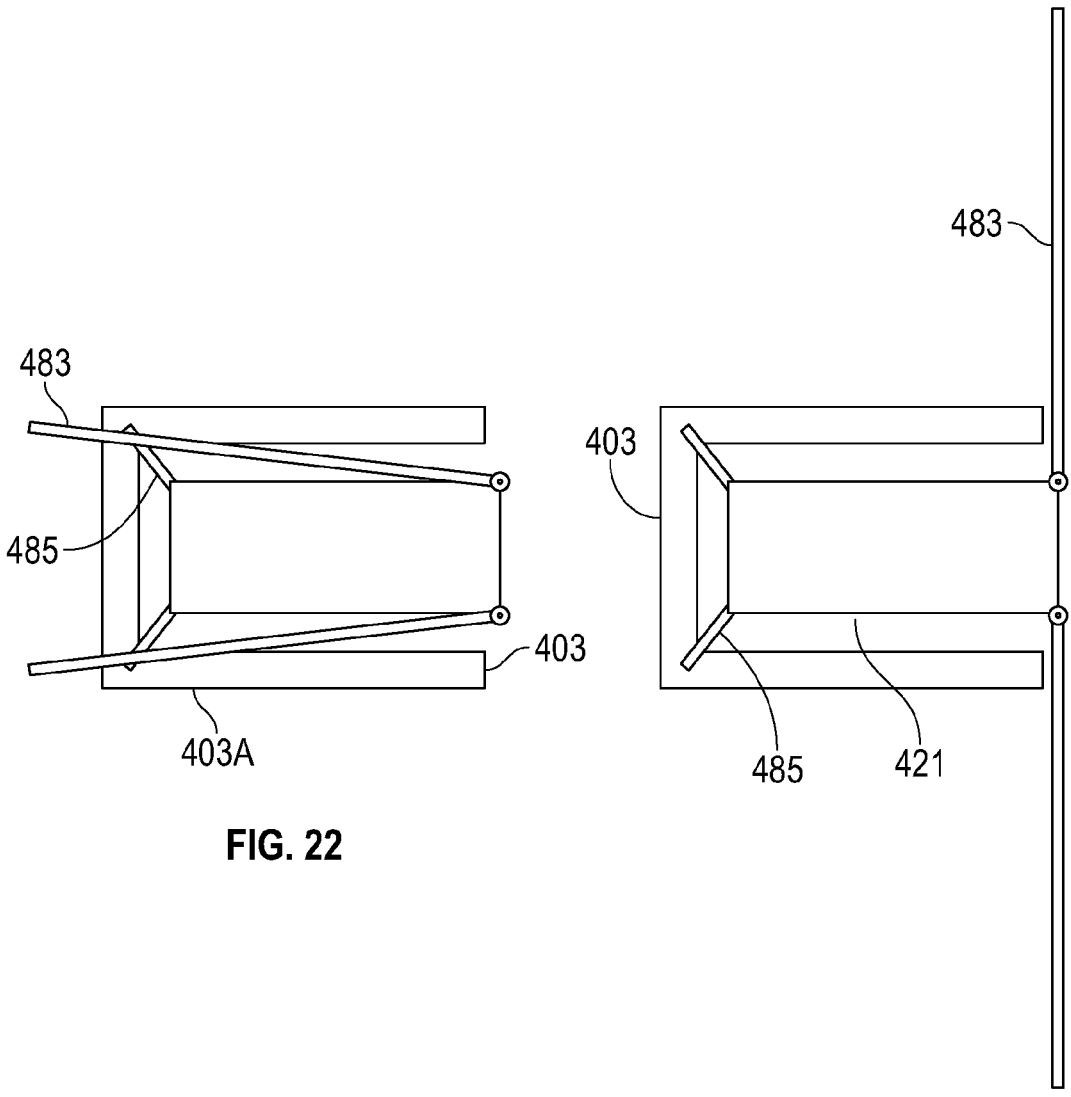
FIG. 22
FIG. 23

724

727A

720A

721

716

722

746

746

703

702R

706

707

727B

720B

720

721

718

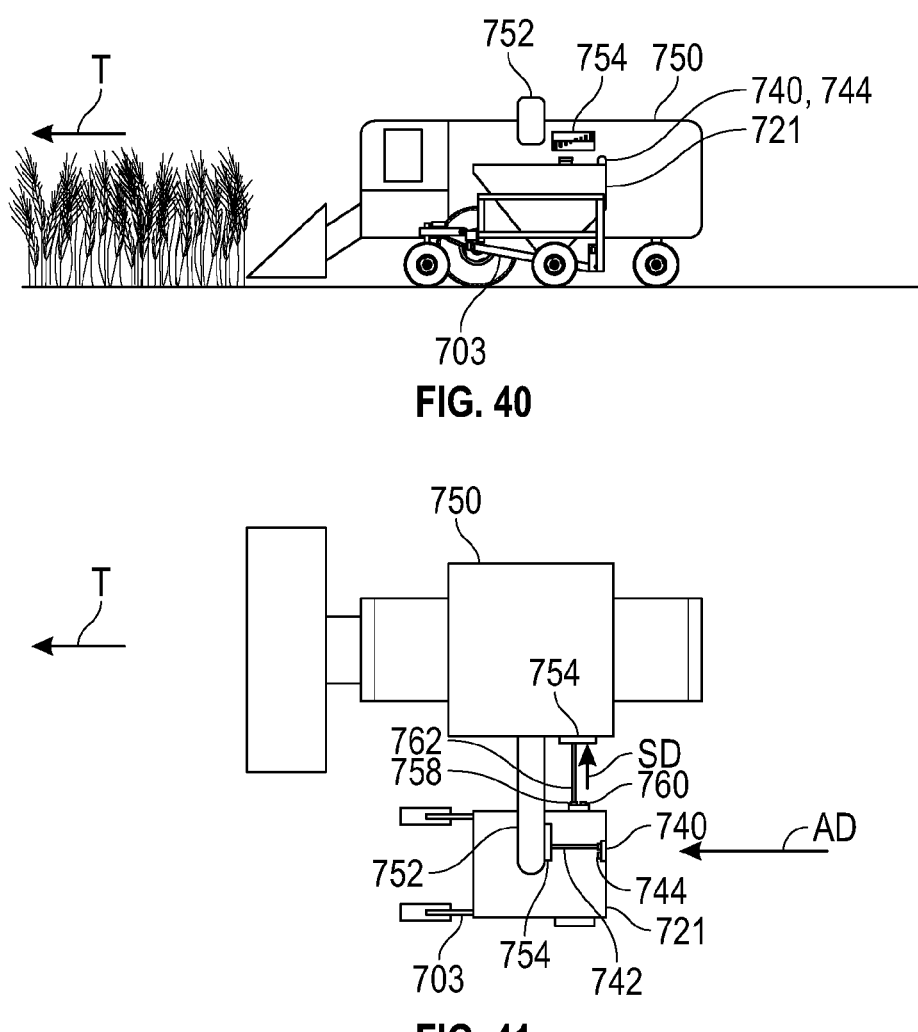
FIG. 40
FIG. 41
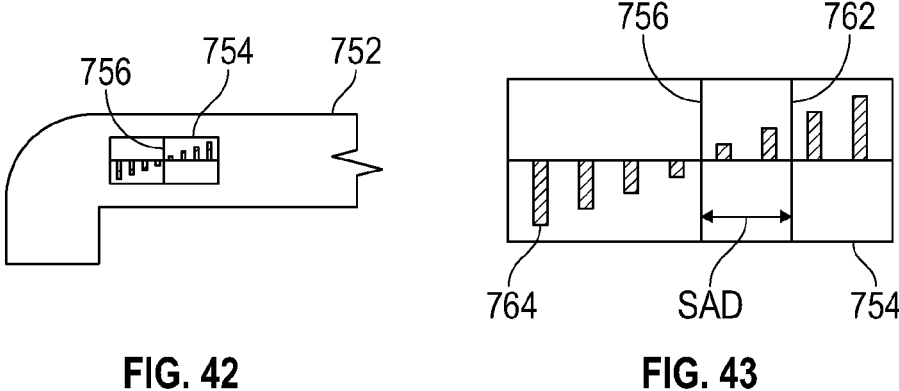
FIG. 42
FIG. 43

UNIDIRECTIONAL IMPLEMENT OPERATING APPARATUS

This disclosure relates to the field of implements for use in industries such as agriculture, mining, construction and the like, and in particular to an implement support and drive apparatus or a variety of implements.

PRIORITY

This patent application is a U.S. National Stage Application under 35 U.S.C. 371 from International Application No. PCT/CA2020/051122, filed Aug. 14, 2020, and published as WO 2021/030904 on Feb. 25, 2021, which claims the benefit of priority to Canada Application Serial No. 3,052,153, filed Aug. 16, 2019, which are incorporated by reference herein in [its] their entirety.

BACKGROUND

Implements such as are used in agriculture and various industries such as mining, road construction and maintenance, and the like include a wide variety of sizes and configurations. Implements such as combines, swathers, sprayers, road graders, earth movers, and the like are commonly self-propelled, with the engine, drive system, and operators station incorporated into the implement itself. Implements such as air seeders, cultivators, discs, grain carts, mowers, and the like are more commonly towed behind a tractor. Some implements are configured to be mounted directly on a tractor instead of being towed behind, such as snowplows mounted on the front end of a tractor, mowers mounted under a middle portion of the tractor, and a wide variety of implements mounted to the arms of a three point hitch system commonly incorporated on the rear end of tractors.

Some self-propelled implements have comprised a drive unit, which includes the engine, drive train, and operator's station, and different implements which can be mounted to the drive unit. For example United States Published Patent Application Number 2019/0053417 of the present inventor Beaujot discloses an implement operating apparatus with a U-shaped drive frame supported on drive wheels, each pivotally mounted about a vertical wheel pivot axis. Various implements are configured to perform various operations and can be connected to the drive frame. The drive frame and implement move and steer along a first travel path or a second travel path oriented generally perpendicular to the first travel path.

Also the advent of very accurate external positioning systems using global positioning satellites (GPS) and the like has more recently led to the development of robotic agricultural vehicles with no operators station. The Beaujot apparatus can be automatically controlled by a microprocessor programmed with field parameters or by an operator with a remote control device. Similarly U.S. Pat. No. 9,271, 439 to Bourgault et al. discloses a robotic air seeder.

SUMMARY OF THE INVENTION

The present disclosure provides an implement operating apparatus that overcomes problems in the prior art.

In a first embodiment the present disclosure provides an implement operating apparatus comprising a U-shaped drive frame comprising a base beam and right and left substantially parallel side beams extending rearward from corresponding right and left end portions of the base beam and defining an open implement area between the right and left side beams. A front wheel supports the base beam and right and left drive wheels are mounted to the corresponding right and left side beams and support the right and left side beams, each drive wheel is rotatable about a corresponding drive wheel axis that is fixed in a substantially horizontal orientation perpendicular to an operating travel direction that is substantially aligned with the right and left side beams. A power source is mounted to the base beam and connected through a drive control to rotate the right and left drive wheels, and a steering control is operative to steer the drive frame over a ground surface along an operating path oriented in the operating travel direction. First and second implements are each configured to perform an implement operation and to rest on the ground surface when in an idle position. The first and second implements and the drive frame are configured such that when each implement is in the idle position, the drive frame is movable rearward with respect to each implement to an implement loading position where each implement is connectable to the drive frame and is movable to an operating position where each implement is supported by the drive frame and is connected to an implement control system operative to control implement functions. Each of the first and second implements provides a beam lock connection between the right and left side beams, and when each of the first and second implements is in the operating position, the beam lock connection resists twisting movement of the right and left side beams to maintain the right and left drive wheels and the right and left side beams in a substantially fixed relationship with respect to each other.

In a second embodiment the present disclosure provides an implement operating apparatus comprising a U-shaped drive frame comprising a base beam and right and left substantially parallel side beams extending rearward and sloping downward from corresponding right and left ends of the base beam and defining an open implement area between the right and left side beams. A front wheel supports the base beam and right and left drive wheels are mounted to the corresponding right and left side beams and support the right and left side beams, each drive wheel rotatable about a corresponding drive wheel axis that is fixed in a substantially horizontal orientation perpendicular to an operating travel direction that is substantially aligned with the right and left side beams. A power source is mounted on the drive frame and connected through a drive control to rotate the right and left drive wheels, and a steering control is operative to steer the drive frame over a ground surface along an operating path oriented in the operating travel direction. First and second implements are each configured to perform an implement operation and to rest on the ground surface when in an idle position, and the first and second implements comprise a front implement load support and right and left rear implement load supports. The first and second implements and the drive frame are configured such that when each implement is in the idle position, the drive frame is movable rearward with respect to each implement to an implement loading position where each implement is connectable to the drive frame and is movable to an operating position where each implement is supported on the front implement load support and on the right and left rear implement load supports by a corresponding front bearing member mounted to the drive frame and corresponding right and left rear bearing members attached to the corresponding right and left side beams and where each implement is connected to an implement control system operative to control implement functions.

In a third embodiment the present disclosure provides a method for maneuvering a vehicle into a desired alignment with respect to a target object. The method comprises mounting a target surface on the target object, the target surface including a visible target in a central portion of the target surface; mounting a laser source on the vehicle and shining a laser beam from the vehicle in a fixed direction with respect to the vehicle; mounting a camera on the vehicle oriented in alignment with the laser beam; maneuvering the vehicle to a position where the laser beam strikes the target surface and a reflection of the laser beam off the target surface is visible to the camera; viewing the camera output and maneuvering the vehicle to align the laser beam with the target.

The present disclosure provides an implement operating apparatus that moves along a length wise path aligned with the side beams. Heavy implement loads can be carried by the drive frame because it is configured to resist torque forces caused by implement weights that are off set from the drive wheel paths and by turning and sloping ground. Since the implement weight is carried on the drive wheels, it is not necessary to provide ballast to maintain traction of the drive wheels as is often necessary in conventional implement operating equipment. An alignment system facilitates loading and operating implements.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 21 is a schematic side view of an implement in the idle position where the implement has wings, and where the wings extend forward in the idle position;

FIG. 22 is a schematic top view showing the implement of FIG. 21 in the operating position on a drive frame and in a transport configuration;

FIG. 23 is a schematic top view showing the implement of FIG. 21 in the operating position on a drive frame and in an operating configuration with the wings extending laterally;

FIG. 40 is a schematic side view of a combine and a grain cart implement moving together along a field in an operating travel direction;

FIG. 41 is a schematic top view of the combine and grain cart implement of FIG. 40;

FIG. 42 is a schematic rear view of the discharge auger of the combine showing the placement of the alignment target surface;

FIG. 43 is a schematic front view of the speed target surface, the speed target, and a speed laser beam reflecting from the speed target surface.

DETAILED DESCRIPTION OF THE ILLUSTRATED EMBODIMENTS

Figures 1, 2, 3:
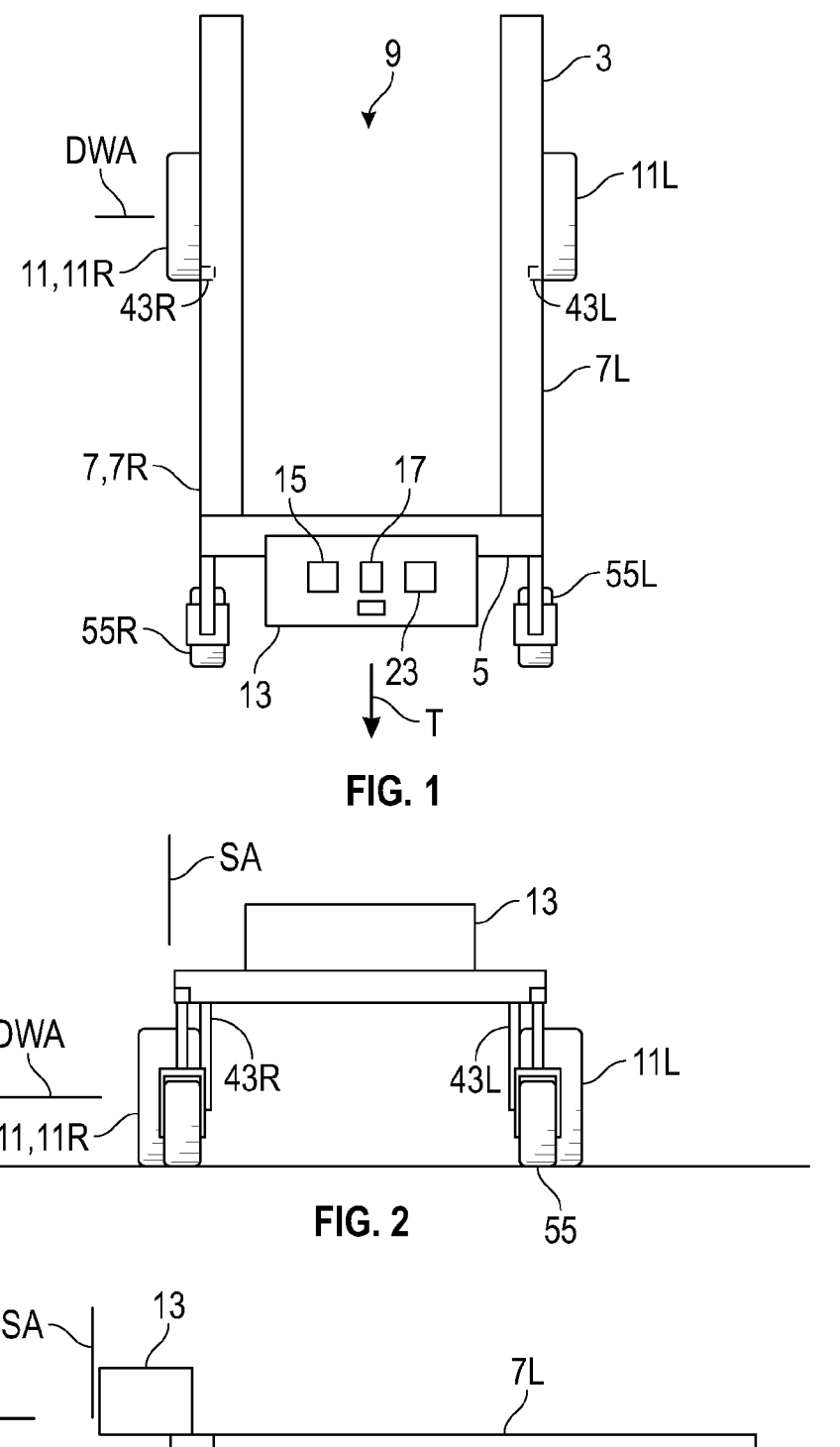
FIG. 1 is a schematic top view of a drive frame of the implement operating apparatus of the present disclosure.
FIG. 2 is a schematic front view of the drive frame of FIG. 1.
FIG. 3 is a schematic side view of the drive frame of FIG. 1.

FIGS. 1-4 schematically illustrate an embodiment of an implement operating apparatus 1 of the present disclosure. The apparatus 1 comprises a U-shaped drive frame 3 comprising a base beam 5 and right and left substantially parallel side beams 7R, 7L extending rearward from corresponding right and left portions of the base beam 5 and defining an open implement area 9 between the right and left side beams 7R, 7L.

The right and left drive wheels 11R, 11L are mounted to the corresponding right and left side beams 7R, 7L and support the right and left side beams. Each drive wheel 11 is rotatable about a corresponding drive wheel axis DWA that is fixed in a substantially horizontal orientation perpendicular to an operating travel direction T. A power source 13, typically a diesel engine of about 300-400 horsepower, is mounted on the base beam 5 and connected through a drive control 15 to rotate the drive wheels 11. Since the drive wheels 11 are fixed, and since the power source 13 is attached to the base beam 5 forward of the inner edge thereof the open implement area 9 provides a space that can be maintained clear of obstructions and so accommodate a wide range of implements 21. Dual wheels could also be added to the drive wheels 11 as is known in the art.

A steering control 17 is operative to steer the drive frame 3 over the ground surface 19 along an operating path oriented in the operating travel direction T. Depending on the implement being used the drive frame 3 will move in either forward or reverse directions along the operating path. For convenience in this description the forward end of the apparatus 1 is referenced as the end where the base beam 5 is located and where the power source 13 is mounted.

Figure 4:
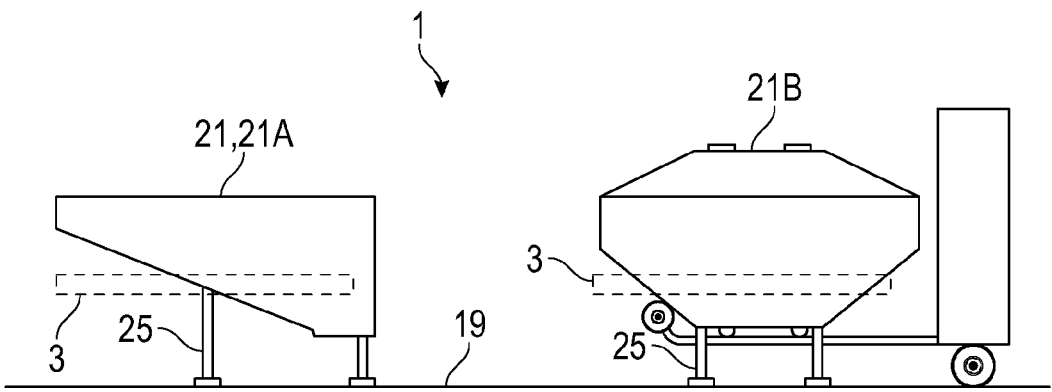
FIG. 4 is a schematic side view of first and second implements of the implement operating apparatus for use with the drive frame of FIG. 1.

First and second implements 21A, 21B are each configured to perform an implement operation and to rest on the ground surface 19 when in the illustrated idle position. The implements 21 can include a wide variety of implements that might be used in agriculture, construction, mining and like industries. FIG. 4 shows implements 21A and 21B. Implement 21A is a hoppered container such as might be used to carry gravel, grain or the like with a capacity of 40,000-60,000 pounds. Implement 21B is an air seeder with folded wings with a width of 50-60 feet such as would be used in agriculture.

The implements 21 and the drive frame 3 are configured such that when each implement is in the idle position, the drive frame 3, schematically illustrated by phantom lines, is movable rearward with respect to each implement 21 in the idle position to an implement loading position where each implement 21 is connectable to the drive frame 3 and is movable to an operating position where each implement 21 is supported by the drive frame 3 and is connected to an implement control system 23 operative to control implement functions. Once an implement 21 is supported on the drive frame 3 the stands 25 that support the implements 21 in the idle position are removed, folded, or retracted.

The illustrated apparatus 1 is operated robotically using location sensors connected to global positioning satellites or the like to operate the drive control 15, steering control 17, and implement control system 23 according to pre-programmed instructions and the sensed location of the apparatus 1.

Figure 5:
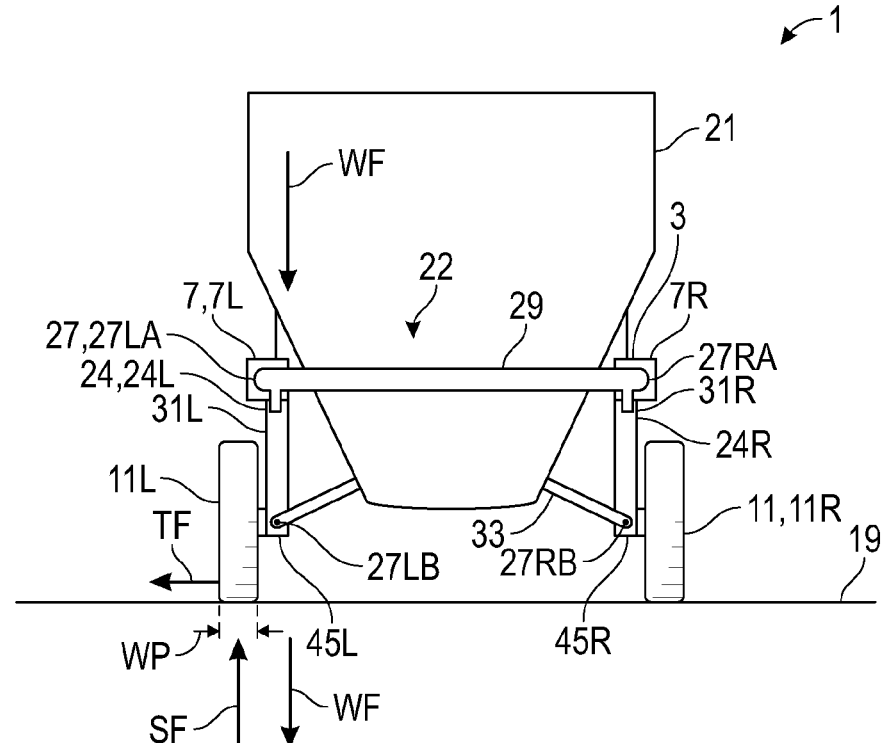
FIG. 5 is a schematic rear view of the first implement of FIG. 4 in the operating position on the drive frame of FIG. 1.

FIG. 5 schematically illustrates a rear view of a typical implement 21 supported on the right and left side beams 7R, 7L of the drive frame 3. The weight of the implement 21 bears against the side beams 7 along force line WF, and the weight of the rear portion of the apparatus 1 including the implement 21 and the drive frame 3 is supported by the wheels 11 along support force line SF in the center of the wheel path WP. It can be seen that where the weight of the implement 21 is high, such as when the implement is configured to carry soil, gravel, grain, or the like, a significant torque force TF is exerted that will tend to move the wheels 11 outward. Further torque forces TF also occur when the apparatus 1 is operating on sloping ground, and while turning, especially at higher speeds.

To address this issue, cross members may be incorporated into the drive frame 3 however it would then be necessary to configure every implement to accommodate the cross members. It would be possible to remove one cross member and substitute another for a particular implement, however this would be laborious and time consuming and so in the disclosed apparatus 1, these cross members are incorporated into each implement and attach to the drive frame 3 during the loading process. Thus each implement includes the cross member support required for that particular implement in a beam lock connection 22, and the open implement area 9 remains clear.

Each of the first and second implements 21A, 21B provides a beam lock connection 22 between the right and left side beams 7R, 7L. When each of the implements 21 is in the operating position, the beam lock connection 22 resists twisting movement of the right and left side beams 7R, 7L to maintain the right and left drive wheels 11R, 11L and the right and left side beams 7R, 7L in a substantially fixed relationship with respect to each other.

The right and left side beams 7R, 7L comprise corresponding right and left beam attachment assemblies 24R, 24L, each beam attachment assembly 24 fixed to the corresponding side beam 7. The right beam attachment assembly 24R defines fixed first and second right beam attachment members 27RA, 27RB that are laterally spaced from each other in directions perpendicular to the operating travel direction T, and the left beam attachment assembly 24L defines fixed first and second left beam attachment members 27LA, 27LB that are laterally spaced from each other in directions perpendicular to the operating travel direction T, In the illustrated apparatus 1, the drive frame 3 includes right and left side bars 31R, 31L rigidly attached at upper portions thereof to the corresponding right and left side beams 7R, 7L, and extending downward from the corresponding right and left side beams. The second right and left attachment members 27RB, 27LB are located at the bottom of the side bars 31 and so are spaced laterally in a vertical direction with respect to the first right and left attachment members 27RA, 27LA.

Figure 7:
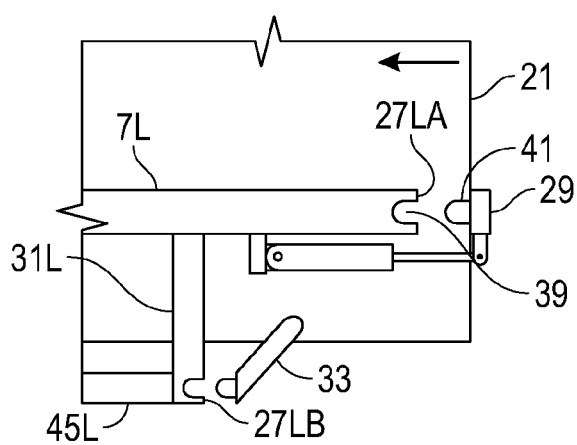
FIG. 7 is a schematic side view showing the attachment of the beam lock connection of the implement apparatus of FIG. 4.

The beam lock connection 22 comprises rigid elements 29 and 33. The illustrated elements 29, 33 form part of the implement 21 that is itself rigid 5 such that the right and left ends of the elements 29, 33 are all rigid with respect to each other. As shown in FIG. 7 the elements 29, 33 engage the first and second right beam attachment members 27RA, 27RB and the first and second left beam attachment members 27LA, 27LB when each implement 21 is in the operating position.

Figure 6:
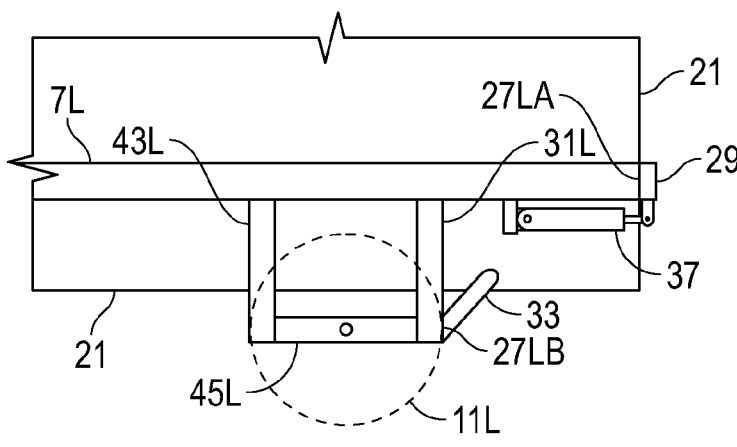
FIG. 6 is a schematic side view of the implement apparatus of FIG. 4.

Thus the beam attachment members 27RA, 27RB, 27LA, 27LB are held in a rigid relationship with respect to each other, and so the right and left drive wheels 11R, 11L and the right and left side beams 7R, 7L are maintained in a substantially fixed relationship with respect to each other and the torque forces TF are resisted whether the apparatus is operating on a level or a sloping ground surface 19. As can be seen in FIGS. 6 and 7 the first and second beam attachment members on each side are also longitudinally spaced in directions parallel to the operating travel direction T forward and rearward with respect to each other.

FIG. 6 schematically illustrates a left side view of implement 21 of FIG. 5 supported on the right and left side beams 7R, 7L of the drive frame 3. The elements 29, 33 are incorporated into the implement 21 and move into engagement with the left beam attachment members 27LA, 27LB as the drive frame 3 moves rearward with respect to the implement 21 in response to a force exerted by a loading hydraulic cylinder 37 as shown in FIG. 7. In the illustrated apparatus 1 the beam attachment members 27LA, 27LB comprise a recess 39 configured to receive a projection 41. The loading hydraulic cylinder 37 is operative to maintain a high forward bias force on the implement 21 to maintain the engagement during operation. Alternatively or in addition mechanical locks or latches could be provided.

In the illustrated apparatus 1, right and left front side bars 43R, 43L are rigidly attached at upper portions thereof to the corresponding right and left side beams 7R, 7L and extend downward from the corresponding right and left side beams, and the right and left rear side bars 31R, 31L are rigidly attached at upper portions thereof to the corresponding right and left side beams rearward of the corresponding right and left front side bars 43R, 43L. A right wheel support 45R is rigidly attached to lower portions of the right front and rear side bars 43R, 31R and a left 45L wheel support rigidly attached to lower portions of the left front and rear side bars 43L, 31L. The right and left drive wheels 11R, 11L are mounted to the corresponding right and left wheel supports 45R, 45L.

In the apparatus 1, the vertical distance between the first beam attachment members 27RA, 27LA and the corresponding second beam attachment members 27RB, 27LB is selected to substantially prevent movement of the right and left rear drive wheels 11R, 11L perpendicular to the operating travel direction T. Also in the schematically illustrated apparatus 1, the front end of the drive frame 3 and any implement mounted on it are shown supported by front wheels 55 which are steered by pivoting same about a vertical steering axis SA using steering hydraulic cylinders 57. Other arrangements are contemplated as well, and the front wheels 55 can also be driven by hydraulic or electric motors connected to the power source 13.

Figure 8:
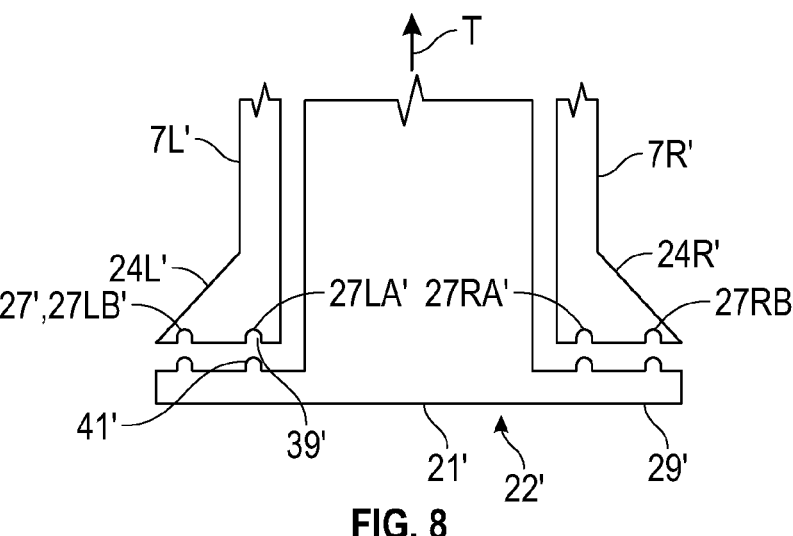
FIG. 8 is a schematic top view of an alternate drive frame and implement with alternate beam attachment assemblies and beam lock connections.

FIG. 8 schematically illustrates a version of the beam attachment assemblies 24R', 24L' with fixed corresponding beam attachment members 27RA', 27RB' and 27LA', 27LB' that are laterally spaced from each other in a horizontal direction perpendicular to the operating travel direction T, and wherein the beam lock connection 22' comprises a rigid implement portion 29' of the implement 21'. Again the beam attachment members 27' each comprise a recess 39' configured to receive a projection 41' on the rigid implement portion 29'. The beam attachment members 27' and the rigid implement portion 29' are maintained in engagement by a loading hydraulic cylinder 37 as shown in FIG. 7, or by a latch or manual lock mechanism.

Figure 9:
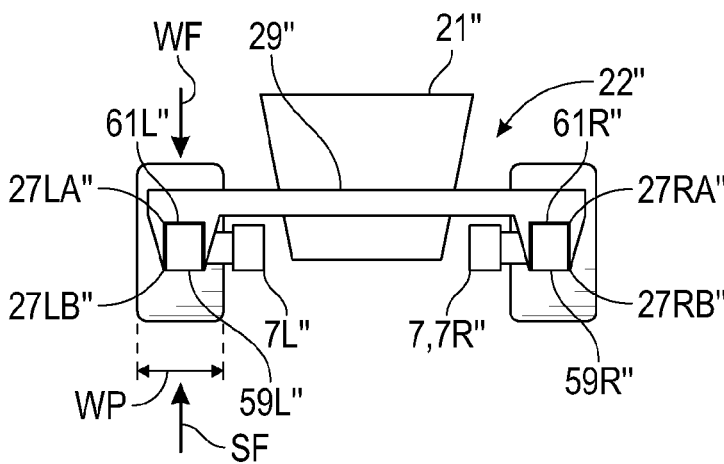
FIG. 9 is a schematic rear view of a further alternate drive frame and implement with the alternate beam attachment assemblies and beam lock connections.
Figure 10:
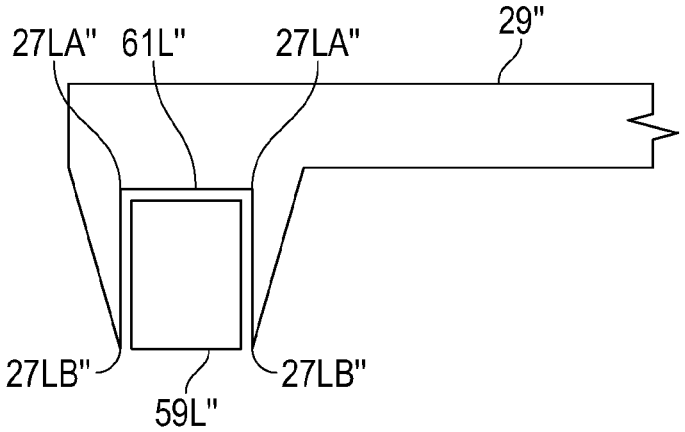
FIG. 10 is a schematic detail showing beam attachment assemblies and beam lock connection of FIG. 9.

FIGS. 9 and 10 schematic illustrate an alternate arrangement where right and left twist struts 59R", 59L" are fixed to the corresponding right and left side beams 7R", 7L", and the beam lock connection 22" comprises right and left twist slots 61R", 61L" fixed to a rigid element 29" on each implement 21", and wherein when moving from the idle position to the operating position the right and left twist slots 61" closely engage the corresponding right and left twist struts 59" to resist twisting movement of the right and left side beams 7". Here the beam attachment members 27RA", 27RB' and 27LA", 27LB' are provided by corners of the slots 61" which bear against the twist struts 59" and prevent twisting when the implement 21" is in the operating position of FIG. 9 if torque forces exert twisting forces on the side beams 7".

As schematically illustrated in FIG. 5, a torque force TF results from the weight of the implement 21 bearing against the side beams 7 along the weight force line WF that is laterally offset from support force line SF in the center of the wheel path WP of wheels 11 which support the drive frame 3. This torque force TF can be removed by aligning the force line WF with the force line SF. In the arrangement of FIGS. 9 and 10, the weight of the rear portion of the implement 21" is carried through the rigid element 29" on the twist struts 59" which are aligned with the center of the wheel path WP, such that the weight force line WF and support force line SF are aligned. Such a weight distribution reduces the torque forces however the torque forces resulting from sloping terrain and turning the apparatus 1 still remain, and are resisted by the beam lock connection 22.

Figure 11:
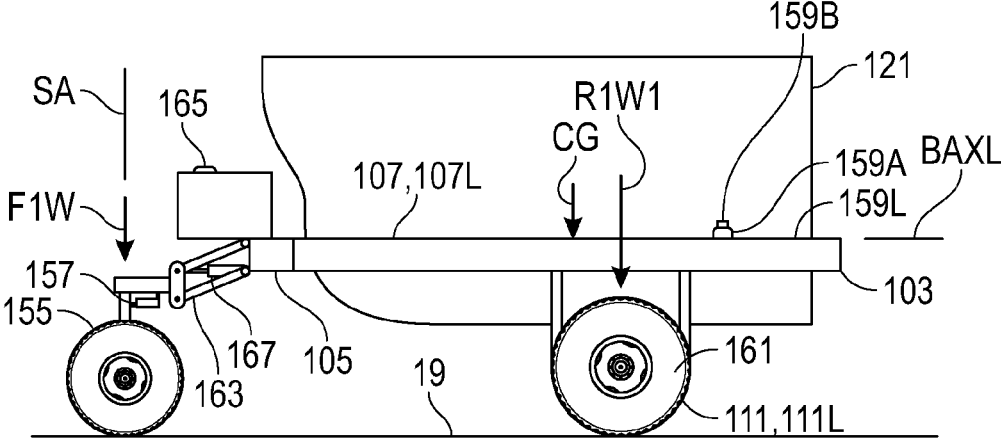
FIG. 11 is a schematic side view of an alternate drive frame and implement configured to align the implement weight above centers of the drive wheel paths to reduce torque forces.
Figures 12, 13, 14:
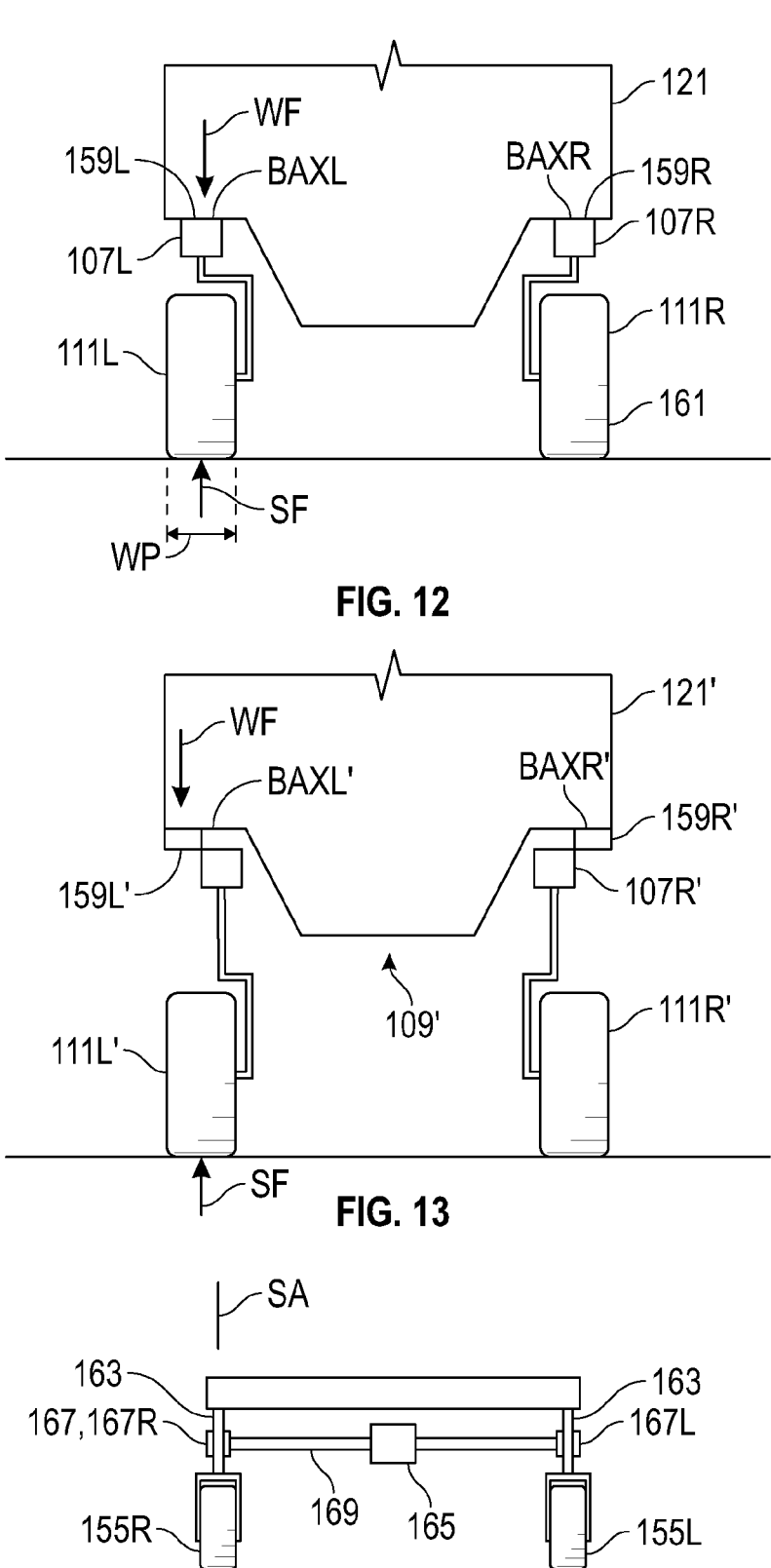
FIG. 12 is a schematic rear view of the drive frame and implement of FIG. 11 where the drive wheels are directly below the side beams and the implement rests on the side beams.
FIG. 13 is a schematic rear view of an alternate arrangement where the drive wheels are mounted laterally offset from the corresponding side beams and bearing members are rigidly fixed to the right and left side beams and extend laterally to support the implement weight above centers of the drive wheel paths.
FIG. 14 is a schematic front view of the drive frame of FIG. 12 showing the elevation control.

FIGS. 11 and 12 schematically illustrate a drive frame 103 and an implement 121 configured to align the weight force line and the support force line to reduce torque forces. When the implement 121 is in the illustrated operating position, a front implement weight FIW of the implement 21 is supported on a front portion of the drive frame which is supported by front wheels 155 and a rear implement weight RIW of each implement is supported on a rear portion of the drive frame which is supported by drive wheels 111.

Because of the typical mounting location with a central portion of the implement 121 directly above the rear drive wheels 111, the rear implement weight RIW is significantly greater than the front implement weight FIW and provides ballast for the drive wheels 111. A significant issue with conventional tractor drawn trailing implements is the need to add ballast to the tractor to increase the traction of the drive wheels and reduce slippage. With the drive frame and implement combinations disclosed here the ballast is provided by mounting the implement so the greater rear implement weight is supported by the drive wheels.

To align the weight force line WF with the support force line SF, right and left rear bearing members 159R, 159L can be fixed to the corresponding right and left side beams 107R, 107L and located on right and left bearing axes BAXR, BAXL substantially aligned with the operating travel direction T and directly above centers of the right and left drive wheels 111R, 111L.

In the rear view of FIG. 12 it can be seen that the implement 121 rests directly on the side beams 107 such that the rear bearing members 159 are provided by the side beams 107, and the right and left drive wheels 111R, 111L are mounted directly under the corresponding right and left side beams 107R, 107L, and wherein the right and left rear bearing members 159 are located on the right and left side beams. In this version the whole weight of the implement 121 is carried on the side beams 107 along the right and left bearing axes BAXR, BAXL, with the side beams 107 in turn supported on the drive wheels 111 supporting the rear implement weight RIW and the front wheels 155 supporting the front implement weight FIW. While the weight of the implement 121 is carried all along the length of the side beams 107, it can be seen that the approximate center of gravity (CG) of the implement 121 will be much closer to the rear drive wheels 111 than to the front wheels 155, and so most of the weight of the implement 121 is supported on the rear drive wheels 111.

To concentrate weight of the implement 121 at a desired location along the bearing axes, raised rear bearing members 159A can be provided that coincide with rear bearing points 159B on the implement 121, instead of bearing the weight of the implement along the whole length of the side beams 107. The torque forces are less problematic at front portions of the side beams, where they are rigidly fixed to the base beam 105 and twisting is resisted effectively by the base beam 105.

Figure 15:
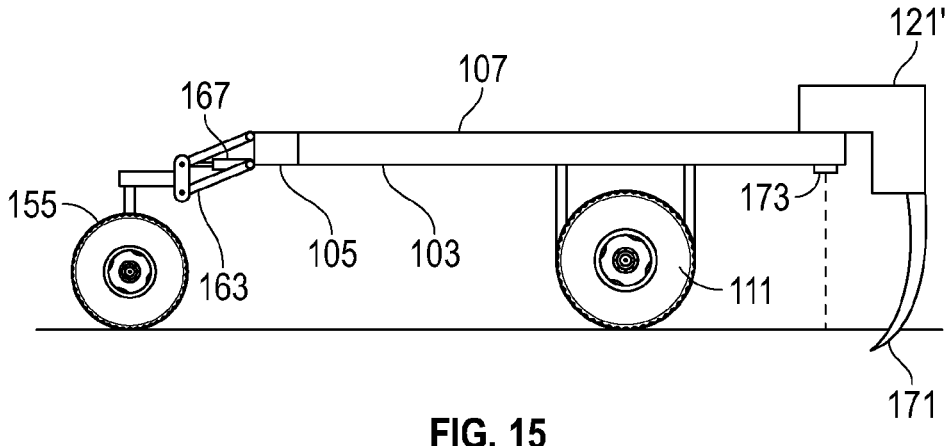
FIG. 15 is a schematic side view of the drive frame of FIG. 12 with the front wheels in a level position and ground engaging tools of an implement penetrating the ground to a level working depth.

FIG. 13 schematically illustrates an alternate arrangement configured to align the weight force line and the support force line to reduce torque forces. In the arrangement of FIG. 15, the right and left drive wheels 111R', 111L' are mounted laterally offset from the corresponding right and left side beams 107R', 107L' outside the open implement area 109' and the right and left bearing members 159R', 159L' are rigidly fixed to the right and left side beams 107R', 107L' and extend laterally to the corresponding right and left bearing axes BAXR', BAXL'.

As seen in FIG. 11 tires 161 are mounted to the drive wheels 111 and bear against the ground surface 19 to support the drive frame 103. As seen in FIG. 11 the front wheels 155 are connected to the base beam 105 and the steering control steers the drive frame 103 by operating the steering hydraulic cylinders 157 to pivot the front wheels 155 about vertical steering axes SA.

Figure 16:
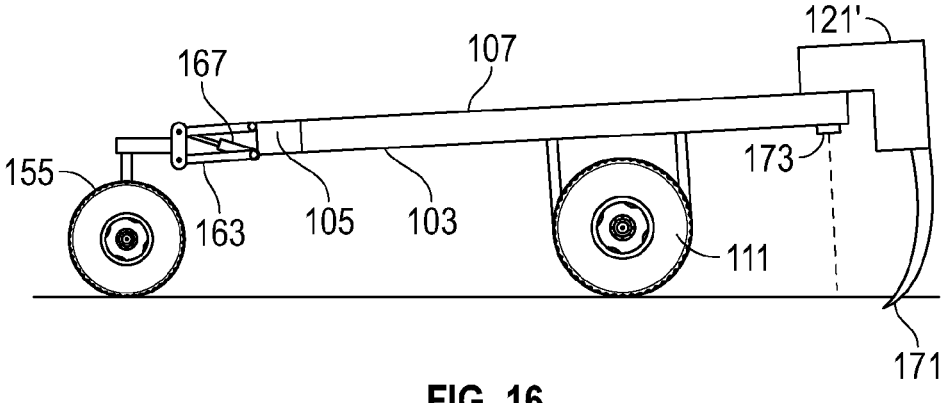
FIG. 16 is a schematic side view of the drive frame of FIG. 12 with the front wheels in a raised position and ground engaging tools of an implement penetrating the ground to a reduced working depth.
Figure 17:
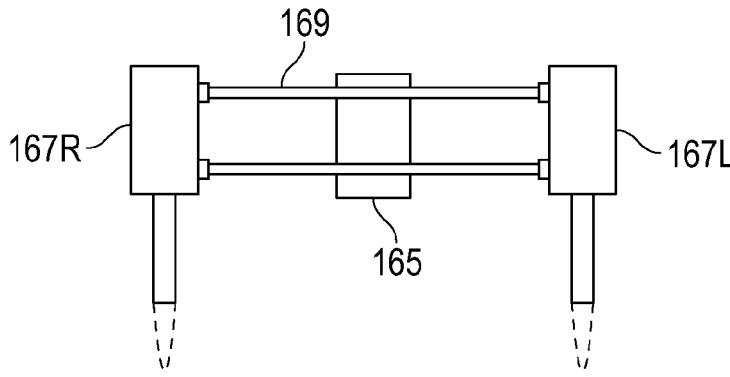
FIG. 17 schematically illustrates the connection of the hydraulic cylinders of the elevating control of the drive frame of FIG. 12.

FIGS. 14-17 schematically illustrate the operation of an elevation control 165. In the illustrated drive frame 103 the front wheels 155 are mounted to the base beam 105 by parallel linkages 163. The right and left level hydraulic cylinders 167R, 167L are connected by hydraulic conduits 169 (see FIG. 17). The elevation control 165 maintains a controlled fixed quantity of hydraulic fluid in the circuit comprising the level hydraulic cylinders 167 and hydraulic conduits 169 and the right and left level hydraulic cylinders 167R, 167L are connected by the hydraulic conduits 169 as shown in FIG. 17. It can be seen that as one level hydraulic cylinder 167 retracts the other will extend, and the corresponding front wheel 155 will rise or fall in response to the retraction or extension. In this way both of the front wheels 155 are maintained on the ground as the drive frame 103 travels over uneven ground surfaces, and the base beam 105 is maintained at a substantially constant height above the ground.

The level control 165 is also operative to increase or decrease the quantity of hydraulic fluid in the circuit to raise or lower the base beam 105 and the front end of the drive frame 103. FIG. 15 shows the quantity of hydraulic fluid at a value that maintains the side beams 107 substantially horizontal in a normal operating position. FIG. 16 shows an increased quantity of hydraulic fluid in the cylinder extending circuit, which causes the level hydraulic cylinders to extend and raise the front wheels 155 with respect to the base beam 105 which in turn causes the base beam to move lower and the rear ends of the side beams 107 to move higher. Reducing the quantity of hydraulic fluid in the circuit will have the opposite effect moving the front wheels 155 down to raise the base beam 105 and move the rear ends of the side beams 107 down.

FIGS. 15 and 16 schematically illustrate an implement 121' attached to the rear ends of the side beams 107 in a substantially fixed position relative to the side beams 107, such that the implement 121' moves upward and downward with the rear ends of the side beams 107. The system can be used, for example, to adjust the depth of penetration into the ground surface 19 of ground engaging tools 171 fixed to the implement 121'. An implement height sensor 173 can be connected to the elevation control 165 that is operative to sense a height of the implement 121', and where the elevation control 165 is operative to maintain the height of the implement 121' at a desired height.

Figure 18:
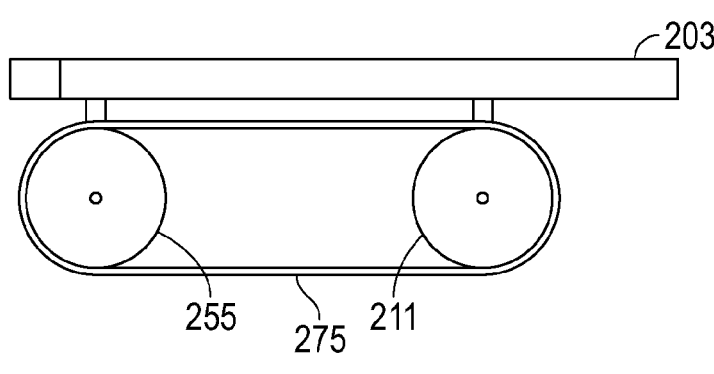
FIG. 18 is a schematic side view of a drive frame supported on tracks.
Figure 19:
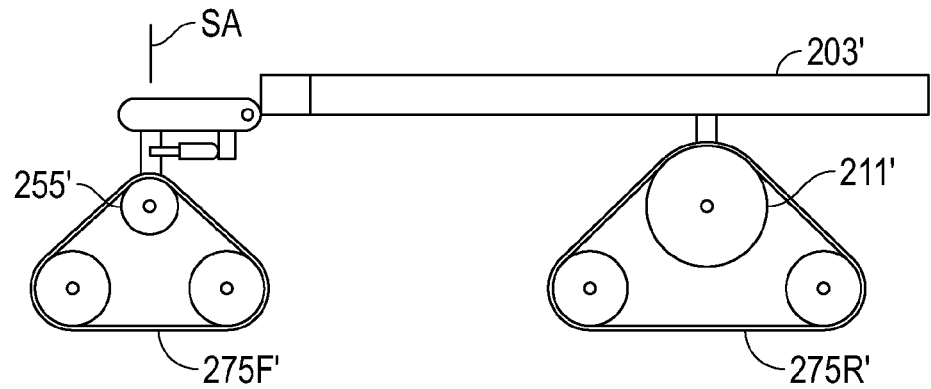
FIG. 19 is a schematic side view of a drive frame supported on an alternate track arrangement.

It is contemplated that tracks can be connected to the drive wheels and/or front wheels in various configurations as are known in the art. FIG. 18 schematically illustrates an arrangement where tracks 275 connected to the drive wheels 211 and the front wheels 255, and wherein the steering control steers the drive frame 203 by varying a rotational speed of the right and left drive wheels 211. FIG. 19 schematically illustrates an arrangement where rear tracks 275R' are connected to the drive wheels 211' and front tracks 275F' are connected to the front wheels 255' the steering control steers the drive frame by pivoting the front wheels 255' and tracks 275F' about a substantially vertical steering axis SA. In the arrangement of FIG. 19 the front wheels 255' would typically be driven wheels.

Figure 20:
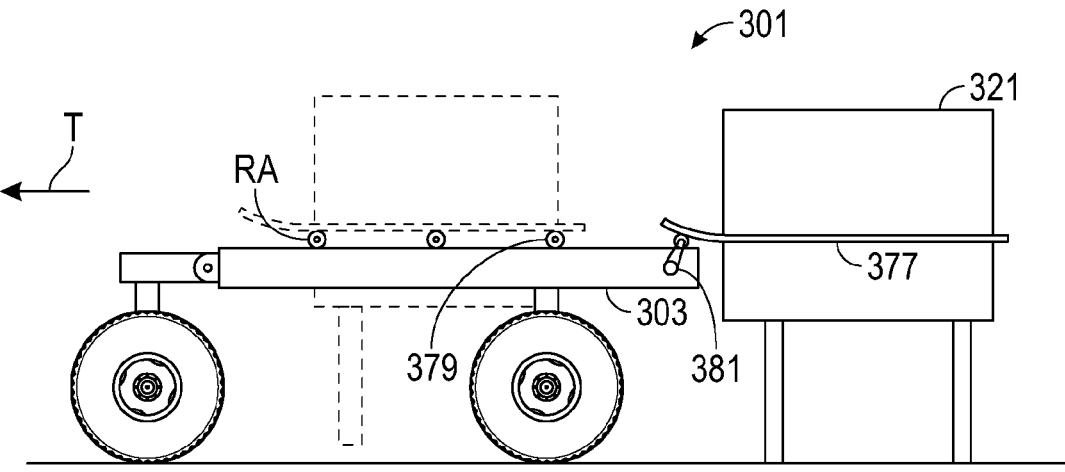
FIG. 20 is a schematic side view of an alternate implement operating apparatus where the implement moves to the operating position on rollers.

FIG. 20 schematic illustrates an implement operating apparatus 301 wherein the implement 321 comprises right and left support plates 377 configured to rest on the drive frame 303. Rollers 379 are mounted to the drive frame 303 about substantially horizontal rotational axes RA oriented substantially perpendicular to the operating travel direction T. When the drive frame 303 is in the implement loading position with respect to the implement 321 in the idle position illustrated in FIG. 20, the rollers 379 on each side of the drive frame 303 are under the support plates 377 on each side of the implement 321, and as the drive frame 303 moves rearward, the implement 321 moves toward the operating position and the rollers 379 bear against the support plates 377 and the implement 321 rolls onto the drive frame 303. A roller drive 381 may be provided that is operative to selectively rotate one or more of the support rollers 379 in a forward direction to assist in moving the implement 321 to the operating position, shown in phantom lines, and in a reverse direction to move the implement 321 to the idle position.

FIGS. 21-23 schematically illustrate an implement 421, such as a spraying implement, that includes right and left wings 483. The right and left wings 483 extend laterally from the drive frame 403 when the implement 421 is in the operating position and in a working configuration as shown in FIG. 23, and the wings 483 extend forward substantially aligned with the operating travel direction T when the implement 421 is in a transport configuration mounted on the drive frame 403 as shown in FIG. 22, and when the implement is in the idle position supported on the ground as shown in FIG. 21.

The wings 483 are supported in the forward positions of FIGS. 21 and 22 by corresponding right and left wing supports 485 attached to the implement 421. To minimize transport widths, the right and left wings 485 are above the right and left side beams 407 inside the tires, and inside outer edges 403A of the drive frame 403 when in the transport configuration and mounted on the drive frame 403 such that the wings are no wider than the drive frame and wheels. In the illustrated drive frame 403 the drive wheels are directly under the side beams of the drive frame. Where the drive wheels extend laterally outside the drive frame the wings in transport will be inside the outer edges of the drive wheels.

Figure 24:
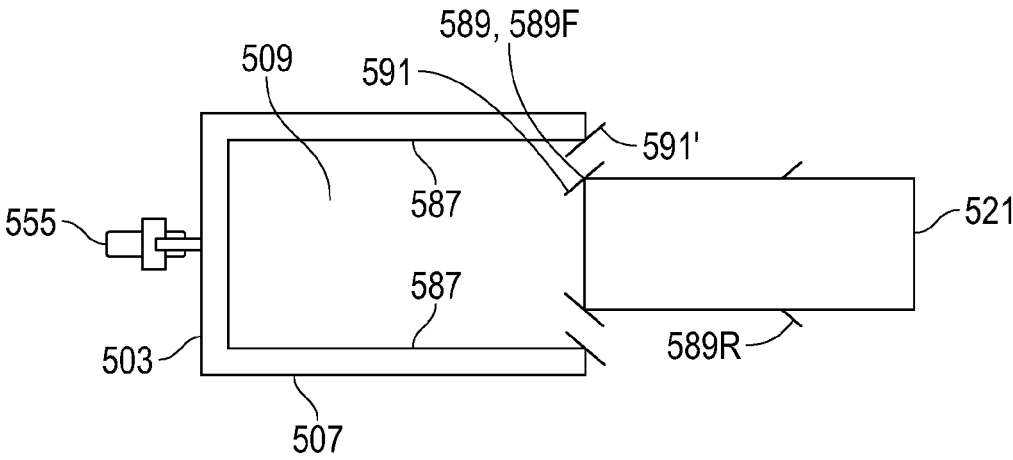
FIG. 24 is a schematic top view of a drive frame and implement where the implement is guided to the operating position by rub guides bearing against rub surfaces.
Figure 25:
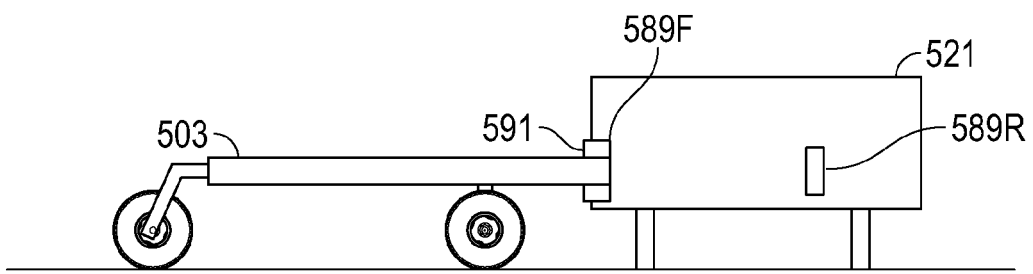
FIG. 25 is a schematic side view of the drive frame and implement of FIG. 24.

FIGS. 24 and 25 schematically illustrate drive frame 503 supported on a centered front wheel 555. Right and left rub faces 587 extending along right and left sides of the drive frame 503. In the illustrated drive frame 503 the rub faces are conveniently provided by inner faces of the corresponding right and left side beams 507. Corresponding right and left rub guides 589 are mounted on the implement 521 and the rub faces 587 and rub guides 589 are configured such that when the drive frame 503 is maneuvered to the implement loading position of FIG. 24 with respect to the implement 521 in the idle position, a forward portion of the implement 521 moves into the open implement area 509 between the right and left side beams 507 and the right and left rub guides 589 contact the corresponding right and left rub faces to guide the implement 521 to the operating position.

Each rub guide 589 comprises a guide surface 591 at a front end thereof that slopes inward away from the corresponding right and left side beams 507. The illustrated implement 521 comprises right and left front rub guides 589F on a forward portion of the implement 521 and right and left rear rub guides 589R located on the implement rearward of the corresponding right and left front rub guides 589F. Sloping guide surfaces 591' could be provided on the rear ends of the side beams 507 as well.

Figure 26:
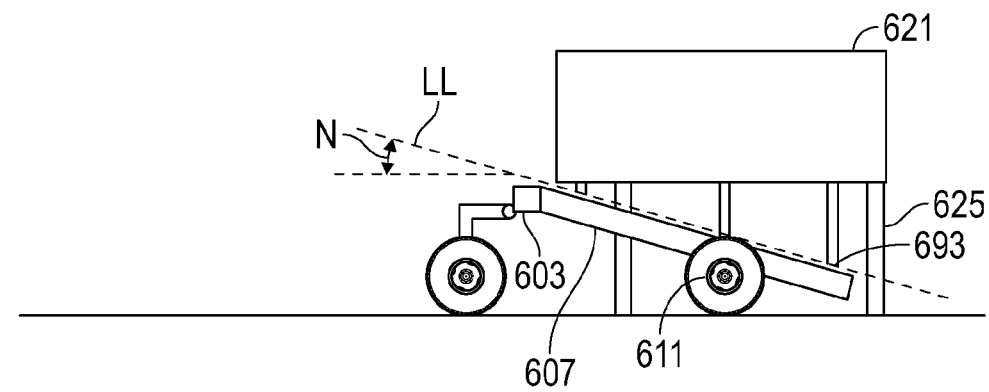
FIG. 26 is a schematic side view of a drive frame where the right and left side beams slope downward from the base beam at a beam angle, and the implement comprises load points along a load line sloping downward from the forward portion of the implement at an angle substantially the same as the beam angle.

FIG. 26 schematic illustrates a drive frame 603 where the right and left side beams 607 slope downward from the base beam 605 at a beam angle N, and wherein the implement 621 comprises load points 693 along a load line LL sloping downward from the forward portion of the implement at an angle substantially the same as the beam angle N. The drive frame 603 can then be maneuvered to the implement loading position of FIG. 26 with respect to the implement 621 in the idle position, where the side beams 607 move under the load points 693, and the jacks 625 supporting the implement in the idle position can then simply be raised to lower the implement to rest the load points 693 on the sloping side beams 607.

To accommodate the slope of the side beams 607, in the drive frame 603 of FIG. 26, the right and left drive wheels 611 are mounted laterally offset from the corresponding right and left side beams 607 outside the open implement area, and the drive wheels 611 extend above the corresponding right and left side beams.

Figure 27:
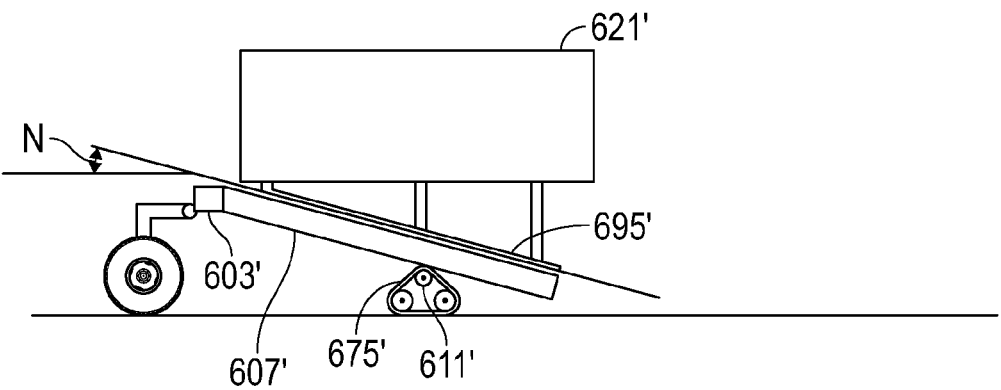
FIG. 27 is a schematic side view of an alternate drive frame supported on tracks where the right and left side beams slope downward from the base beam at a beam angle, and the implement comprises a load brace sloping downward from the forward portion of the implement at an angle substantially the same as the beam angle.

An alternate arrangement of a drive frame 603' is schematically illustrated in FIG. 27 where drive wheels 611' include a track 675' and are mounted directly under the corresponding right and left side beams 607'. The track arrangement allows for a lower profile drive assembly, and so can be mounted directly under the side beams 607'. FIG. 27 also illustrates an implement 621' that includes a load brace 695' extending at the beam angle N so the implement 621' is supported on the load brace 695' bearing against most of the length of the side beams 607', rather than only on the load points 693 in the arrangement of FIG. 26.

FIGS. 28-32 schematically illustrate an implement operating apparatus 701 comprising a U-shaped drive frame 703 comprising a base beam 705 and right and left substantially parallel side beams 707R, 707L extending rearward and sloping downward from corresponding right and left portions of the base beam 705 and defining an open implement area 709 between the right and left side beams 707.

Front wheels 755 support the base beam 705, and right and left drive wheels 711R, 711L are mounted to the corresponding right and left side beams 707R, 707L and support the side beams 707. Each drive wheel 711 is rotatable about a corresponding drive wheel axis DWA that is fixed in a substantially horizontal orientation perpendicular to an operating travel direction T that is substantially aligned with the parallel side beams 707.

A power source 713 is mounted on the drive frame 3 and connected through a drive control 715 to rotate the right and left drive wheels 711, and a steering control 717 is operative to steer the drive frame 703 over a ground surface 19 along an operating path oriented in the operating travel direction T.

As described above a number of different implements 721 are configured to be supported on the drive frame 703 for operation. Each implement 721 is configured to perform an implement operation and to rest on the ground surface 19 when in an idle position shown in FIG. 31 supported on stands 725, and each implement 721 comprises right and left front implement load supports 702F and right and left rear implement load supports 702R. It is contemplated as well that some implements may be supported on a single front implement load support.

Figure 31:
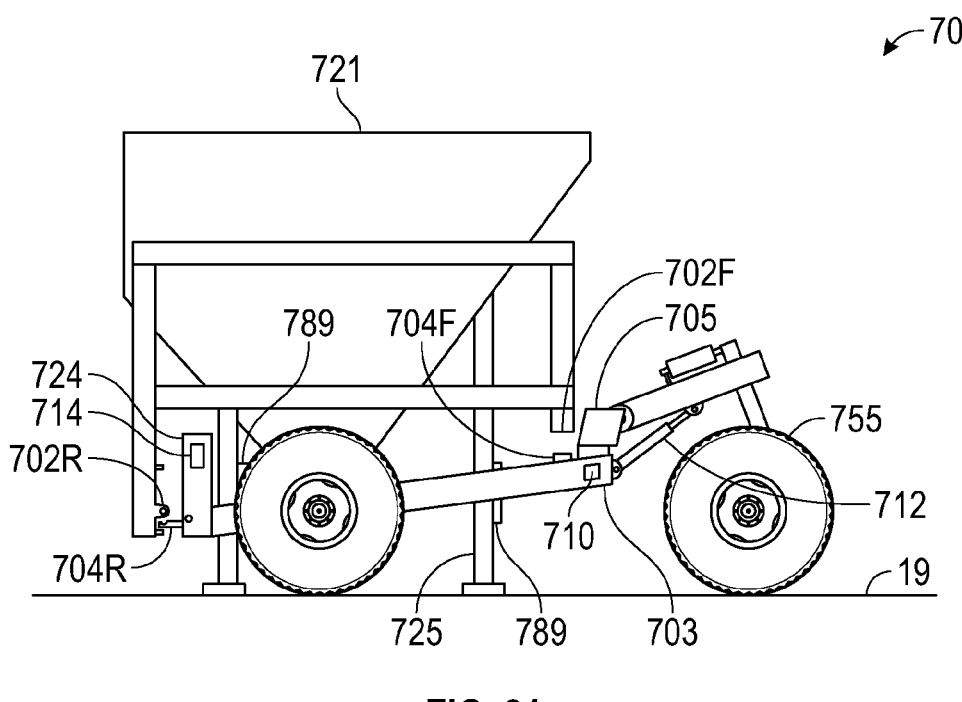
FIG. 31 is a schematic side view of the drive frame of FIG. 28 in the implement loading position with respect to an implement, with the front wheels raised to lower the side beams.
Figure 32:
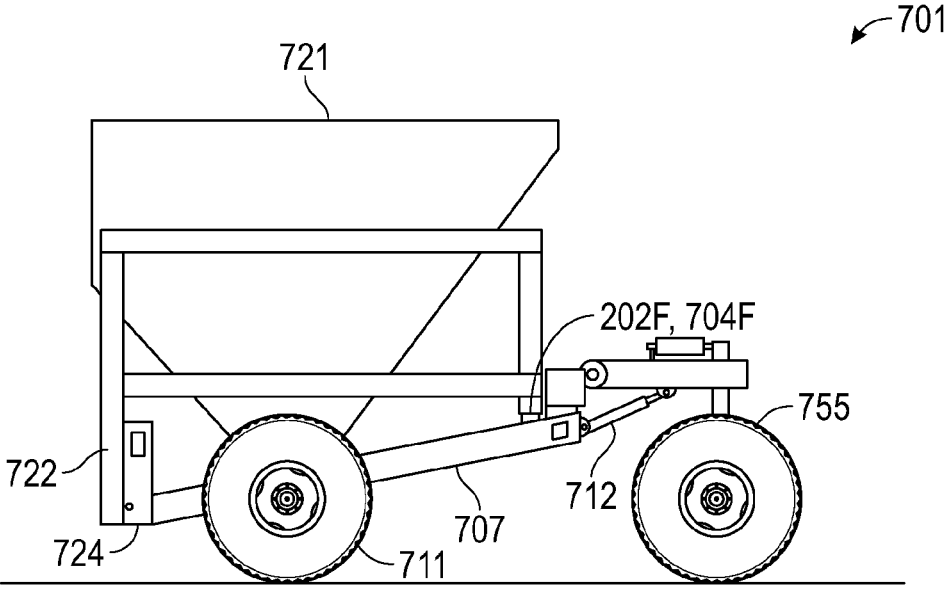
FIG. 32 is a schematic side view of the drive frame and implement of FIG. 32 with the implement in operating position, with the front wheels lowered to raise the side beams and the implement.

The implement 721 and the drive frame 703 are configured such that when the implement 721 is in the idle position of FIG. 31, the drive frame 703 is movable rearward with respect to the implement 721 to an implement loading position shown also in FIG. 31 where the implement is connectable to the drive frame 703 and is movable to an operating position shown in FIG. 32 where the implement is supported on the front implement load supports 702F and on the rear implement load supports 702R by corresponding right and left front bearing members 704F mounted to the drive frame 703 and corresponding right and left rear bearing members 704R attached to the corresponding right and left side beams 707R, 707L and where the implement 721 is connected to an implement control system 723 operative to control implement functions.

The right and left drive wheels 711R, 711L are mounted laterally offset from the corresponding right and left side beams 707R, 707L outside the open implement area 709, and the drive wheels 711 extend above the corresponding right and left side beams 707R, 707L such that the drive wheel axis DWA is in proximity to the side beams 707 and the rear ends of side beams 707 are comparatively close to the ground surface, about the height of a conventional tractor drawbar. Where the implement being operated includes trailing load, such as a cultivator with ground engaging tools, the pulling force is then exerted pulling on the side beams 707 rather than exerting downward forces on the side beams 707, thus reducing stresses on the drive frame 703.

Figure 28:
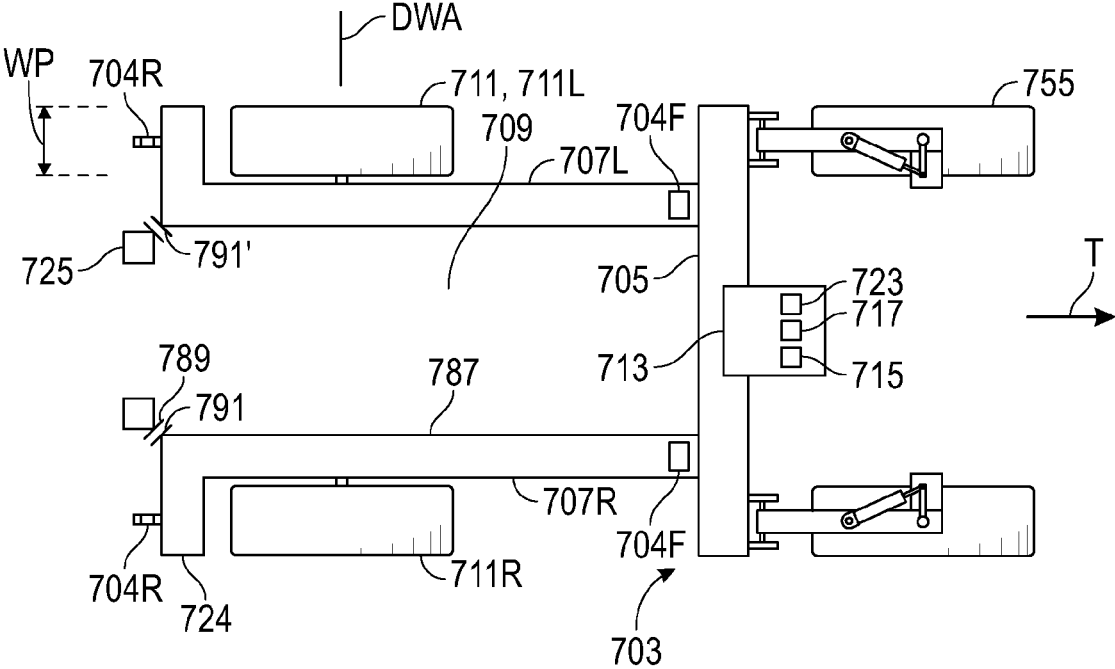
FIG. 28 is a schematic top view of an alternate drive frame with downward sloping side beams, an elevation control to move the front wheels up and down, and beam attachment assemblies attached to rear ends of the side beams directly behind the drive wheels.
Figure 29:
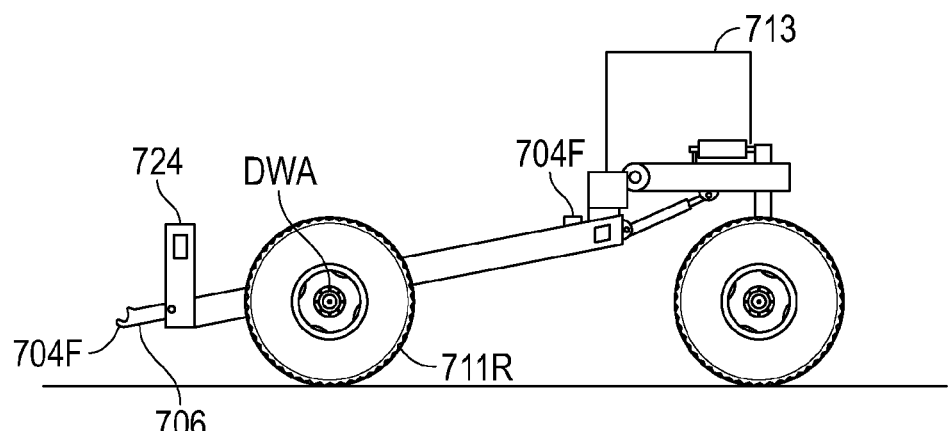
FIG. 29 is a schematic side view of the drive frame of FIG. 28.
Figure 30:
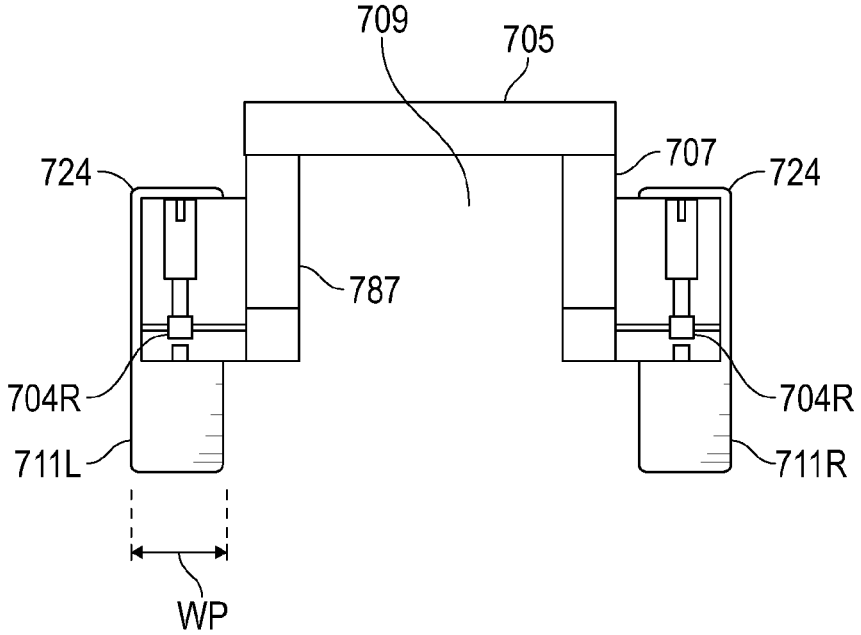
FIG. 30 is a schematic rear view of the drive frame of FIG. 28.

As seen in FIGS. 28 and 30, the rear bearing members 704R are located rearward of the corresponding right and left drive wheels 711 and substantially in alignment with centers of corresponding right and left drive wheel paths WP. The right and left rear bearing members 704R are provided by right and left loading arms 706 pivotally connected to corresponding right and left beam attachment assemblies 724 attached to rear ends of each side beam 707.

To further facilitate loading the implement 721 onto the drive frame 703, an elevation control 710 (see FIG. 31) is connected to elevating hydraulic cylinders 712 and is operative to selectively move the front wheels 755 upward and downward with respect to the base beam 705. The front wheels 755 are moved upward as shown in FIG. 31 to lower the base beam 705 and then the drive frame 703 is moved rearward to the implement loading position of FIG. 31 where the front implement load supports 702F are above the corresponding front bearing members 704F.

Figures 33, 34:
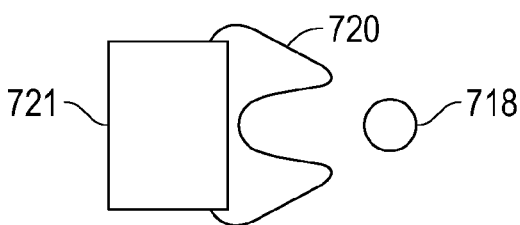
FIG. 33 is a schematic sectional side view of the beam attachment assembly and beam lock connection of the drive frame and implement in the implement loading position of FIG. 31.
FIG. 34 is a schematic bottom view showing the relative positions of the lock plates on the implement and the pins of the beam attachment assemblies when the drive frame and implement are in the implement loading position of FIG. 33.

When the drive frame 703 is in the implement loading position shown in FIG. 31, each loading arm 706 engages the corresponding rear implement load support 702R on the implement 721. A further detail of the rear implement load supports 702R on the implement 721 and the beam attachment assemblies 724 on the drive frame 703 in the implement loading position is shown in FIG. 33 A load control 714 is then operated to extend the load hydraulic cylinders 716 to move the loading arms 706 to the position shown in the detail illustration of FIG. 35, where the rear implement load support 702R moves upward and slightly forward from the idle position of FIG. 33, and the elevation control 710 retracts the elevation hydraulic cylinders 712 to move the front wheels 755 downward to raise the base beam 705 and force the front bearing members 704F (FIG. 32) upward to bear against the corresponding front implement load supports 702F and raise the front portion of the implement above the ground, and so the implement 721 is moved from the idle position to the operating position, and the stands 725 can be removed or folded out of the way. The rear implement weight is carried on the load arms 706 (see FIG. 33) which provide the rear bearing members 704R and which are located in alignment with centers of corresponding right and left drive wheel paths WP.

Figure 35:
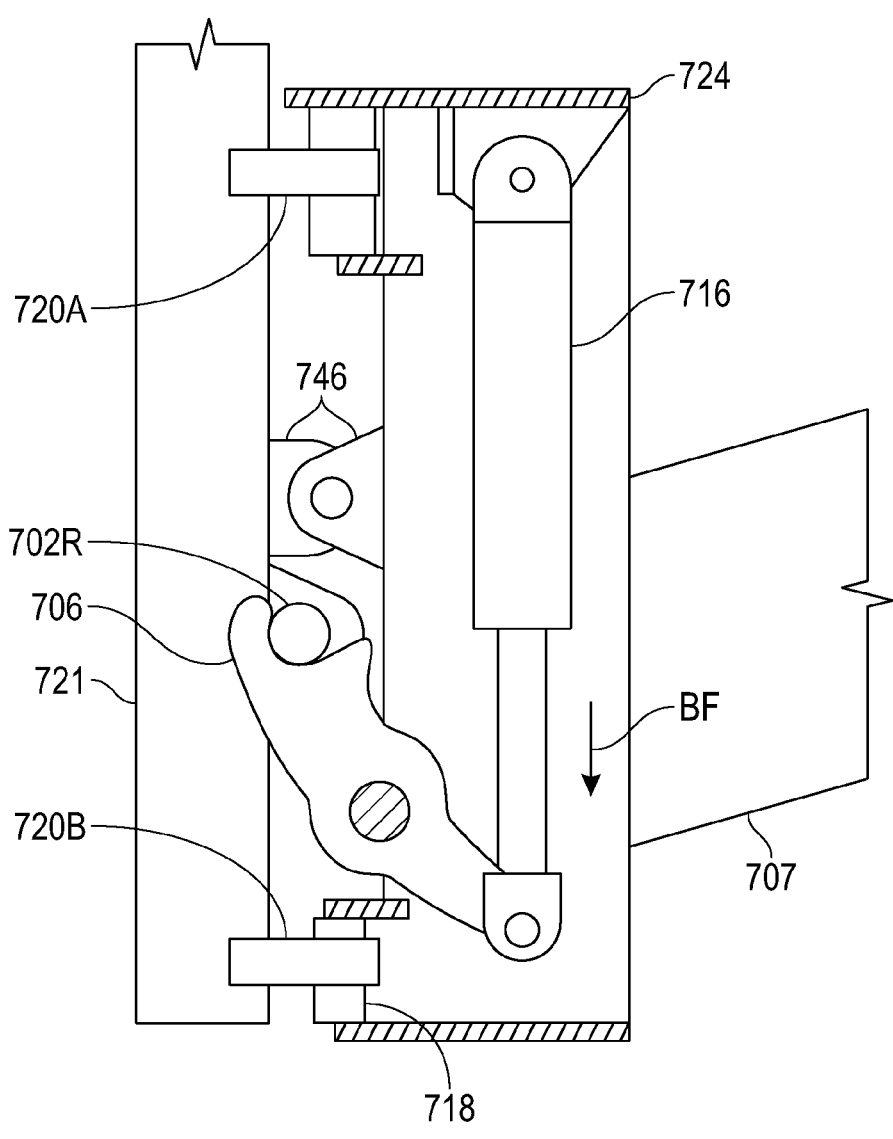
FIG. 35 is a schematic sectional side view of the beam attachment assembly and beam lock connection of the drive frame and implement in the operating position of FIG. 32.
Figure 36:
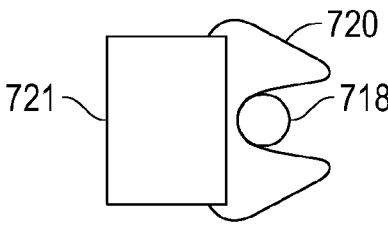
FIG. 36 is a schematic bottom view showing the relative positions of the lock plates on the implement and the pins of the beam attachment assemblies when the implement is in the operating position of FIG. 33 on the drive frame.

As seen in FIGS. 33-36 each beam attachment assembly 724 defines upper and lower beam attachment members 727A, 727B in the form of pins 718 that are laterally spaced vertically from each other. The implement 721 is rigid and includes upper and lower lock plates 720A, 720B configured to engage the pins 718 of the upper and lower beam attachment members 727A, 727 on each of the right and left beam attachment assemblies 724 to prevent lateral movement of the pins 718 when the implement 721 is in the operating position, as shown in FIG. 36.

Thus it can be seen that once the implement 721 is in the operating position of FIG. 32, the load control 714 is then operated to maintain an extending pressure in the load hydraulic cylinders 716 to exert a downward bias force BF on the loading arms 706 to maintain the loading arms 706 and rear implement load supports 702R in fixed positions, and maintain the implement 721 in the operating position with the lock plates 720 engaging the pins 718 of the beam attachment members 727A, 727B and forming a beam lock connection 722 that resists twisting movement of the right and left side beams 707R, 707L to maintain the right and left drive wheels 711R, 711L and the right and left side beams 707R, 707L in a substantially fixed relationship with respect to each other. The implement 721 may be further secured to the drive frame 703 by a safety pin through holes in safety plates 746 which are aligned when the implement 721 is in the operating position as shown in FIG. 35.

In addition, in the apparatus 701 the rear implement weight is supported by the right and left rear bearing members, provided by loading arms 706, that are fixed with respect to the corresponding side beams and located in the center of the wheel paths WP of the drive wheels 711. Since the rear implement weight carried on the right and left rear bearing members is at least twice, and often five or six times, as much as a front implement weight carried on the right and left front bearing members, the combination of the beam lock connection 722, which resists torque forces on the side beams 707, and the alignment of the rear implement weight in the center of the wheel paths WP of the drive wheels 711, which reduces torque forces, significantly reduces stress on the drive frame 703.

The elevation control 710 also can be used with an implement that is attached to the rear ends of the side beams 707 in a substantially fixed position to adjust the vertical position of the implement upward and downward. Also as described above, an implement height sensor can be added to the elevation control to maintain the height of the implement at a desired height.

In the drive frame 703 (shown in FIG. 28) right and left rub faces 787 extend along inner faces of the corresponding right and left side beams 707 and right and left rub guides 789 are mounted on the implement 721. In the illustrated apparatus 701 the rub guides 789 are mounted on the front and rear legs 725 supporting the implement 721 in the idle position. The rub guides 789 include a guide surface 791 at a front end thereof that slopes inward away from the corresponding right and left side beams 707.

When the drive frame 707 is maneuvered to the implement loading position with respect to the implement 721 in the idle position as shown in FIG. 28, the front legs 725 move into the open implement area 709 between the side beams 707 and the right and left rub guides 789 contact the corresponding right and left rub faces 787 to guide the implement 721 to the operating position.

Figure 37:
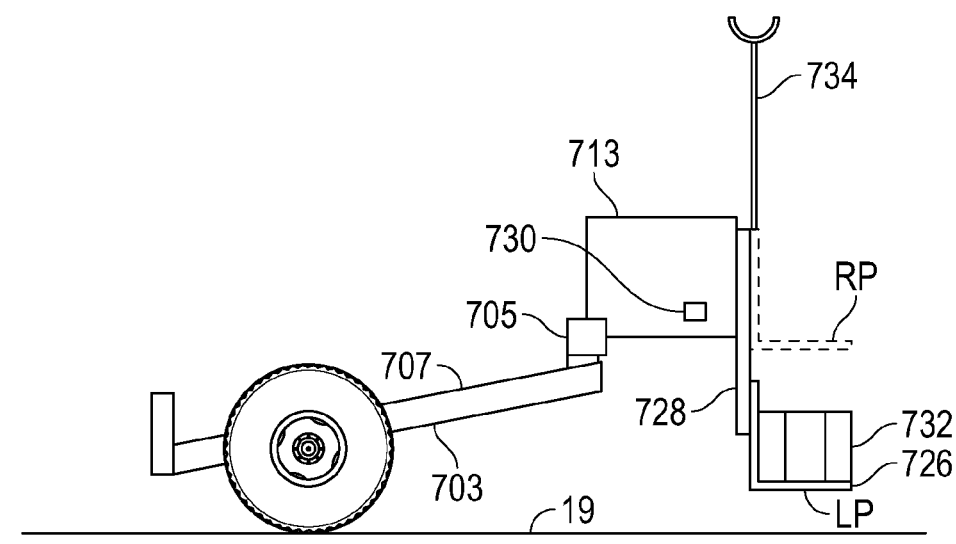
FIG. 37 is a side view of a drive frame with an elevating platform attached to a front end thereof.

FIG. 37 schematically illustrates a horizontally oriented platform 726 mounted on a raising assembly 728, such as a mast or the like, forward of the base beam 705, shown here mounted on the power source 713. A platform control 730 is operative to selectively move the platform 726 from a lowered position LP in proximity to the ground surface 19 to a raised position RP. The front wheels have been removed from the drive frame 703 to facilitate illustration.

The platform 726 is convenient for raising an operator to the power source 713 for human lift for fueling/servicing. An operator may also stand on the platform 726, protected by a guard rail 732 or tether or the like to manually maneuver the drive frame 703 to the implement loading position. GPS antennas 734 may be mounted that move high when in field use and move to a lower position for travel or transport. A lock out is provided so no propulsion is possible when the platform is below a safe height. An operator on the platform 726 in the raised position RP has a clear view over the power unit directly aligned with the side beams 707 maneuvering to load and unload implements.

Figure 38:
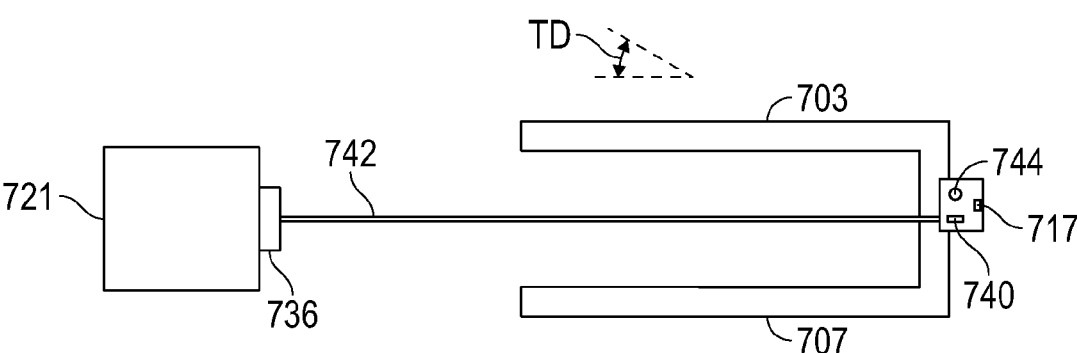
FIG. 38 is a schematic top view of a laser source mounted on a drive frame directing a laser beam at a target surface on the implement, and a camera viewing the relative positions of the laser beam and target to steer the drive frame to the implement loading position.
Figure 39:
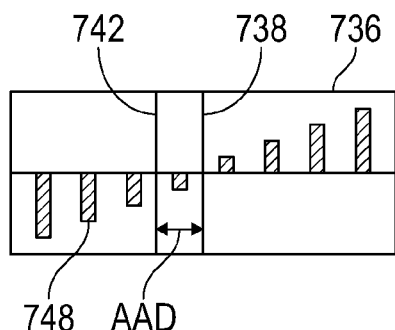
FIG. 39 is a schematic front view of the alignment target surface, the alignment target, and an alignment laser beam reflecting from the alignment target surface.

FIGS. 38 and 39 schematically illustrate a method for maneuvering a vehicle, illustrated as the drive frame 703 into a desired alignment with respect to a target object, illustrated as the implement 721 The method is useful when moving the drive frame 703 into the implement loading position with respect to the implement 721.

The method comprises mounting an alignment target surface 736 on the implement 721 where the alignment target surface 736 includes a visible alignment target 738 in a central portion of the alignment target surface 736. An alignment laser source 740 is mounted on the drive frame 703 and an alignment laser beam 742 shines from the drive frame 703 in a fixed alignment direction AD with respect to the drive frame 703 that is aligned with the side beams 707.

An alignment camera 744 is mounted on the drive frame 703 oriented in alignment with the laser beam 742. The drive frame 703 is maneuvered to a position where the alignment laser beam 742 strikes the alignment target surface 736 and a reflection of the alignment laser beam 742 off the alignment target surface 736 is visible to the alignment camera 744. While viewing the alignment camera output, the drive frame is maneuvered to align the alignment laser beam 742 with the alignment target 738 and the drive frame 703 is moved toward the implement 721 while viewing the alignment camera output and maintaining the laser beam 142 in alignment with the target 738.

The alignment laser beam 742 shines a narrow vertical beam and the illustrated target 738 (shown in FIG. 39) is a vertical line which combination allows the drive frame to maintain alignment while viewing the alignment camera output and maintaining the laser beam 742 in alignment with the alignment target 738 while moving the drive frame toward the implement 721 over undulations in the ground surface which will move the alignment laser beam 742 up and down on the alignment target surface 736.

The drive frame 703 can be maneuvered by an operator viewing the alignment camera output and manually steering the drive frame 703. The alignment camera output and steering control of the drive frame 703 can also be connected to a robotic control operative to interpret the alignment camera output and maintain the alignment laser beam 742 in alignment with the alignment target 738 as the drive frame moves toward the implement 721.

The camera used can be a video camera for manual control, or a camera configured for a robotic control with image recognition software.

The illustrated alignment target surface 736 shown in FIG. 39 includes alignment adjustment markings 748 right and left of the alignment target 738 indicating an alignment adjustment distance AAD to the alignment target 738. The steering control 717 is operated to a greater turn degree TD as the alignment adjustment distance AAD increases, and to a lesser turn degree TD as the alignment adjustment distance AAD decreases.

The method is also useful for a situation where the target object is moving in an operating travel direction at a target speed, and it is desired to maintain a vehicle at a desired distance from the target object and moving at the same speed. FIG. 40 schematically illustrates such a situation where the vehicle is a grain cart implement 721 mounted on the drive frame 703, and the target object is a combine 750. The method can be used to transfer grain into the grain cart implement 721 from the combine grain discharge auger 752 while the combine continues to move along the field harvesting the grain. This procedure requires the implement 721 to attain and maintain a position with respect to the combine 750 where the discharge auger 752 is above the implement 721.

The alignment target surface 754 is fixed to the rear facing side surface of the discharge auger 752 (shown in FIGS. 41, 42), and the alignment laser beam source 740 and the alignment camera 744 are mounted at a top rear of the grain cart implement 721 as shown in FIG. 41. As shown in FIG. 41, a speed target surface 754 is mounted on the side of the combine 750 at a speed location beside the desired location of the grain cart implement 721 and the speed target surface 754 includes a visible speed target 756 in a central portion of the speed target surface 754. A speed laser source 758 and speed camera 760 are mounted on the grain cart implement 721. The speed location is selected such that a speed laser beam 762 shining from the speed laser source 758 strikes the speed target surface 754 when the implement 721 is moving in the operating travel direction T beside the combine 750 in the required position and the alignment laser beam 742 is aligned with the alignment target 738.

The alignment target surface 736, target 738, laser source 740, and camera 744 are the same items as the speed target surface 754, target 756, laser source 758, and camera 760. The terms "alignment" and "speed" are used to differentiate the functions in the described method of operation.

The speed laser source 758 shines the speed laser beam 762 from the implement 721 in a fixed speed direction SD with respect to the implement 721 that is oriented lateral to the fixed alignment direction AD and the speed camera 760 is oriented in alignment with the speed laser beam 762. The fixed speed direction SD is shown oriented at about 90 degrees with respect to the fixed alignment direction AD, and it is contemplated that satisfactory results will be obtained at angles of about 70 to 105 degrees.

The drive frame 703 is maneuvered to a position near the combine 750, using GPS or like external guidance systems, where the implement 721 is rearward of the auger 752 and the fixed alignment direction AD is parallel to the operating travel direction T. The drive control of the drive frame 703 is then operated to move the drive frame 703 at a speed greater than the speed of the combine 750 to move the drive frame 703 to a position beside the combine 750 where the speed laser beam 762 strikes the speed target surface 754 and a reflection of the speed laser beam 762 off the speed target surface 754 is visible to the speed camera 760.

By viewing the speed output of the speed camera 760, a connected robotic control can operate the drive control to adjust a speed of the drive frame 703 to align the speed laser beam 762 with the speed target 756, and can make necessary speed adjustments to follow the combine 750 if same speeds up or slows down to maintain the required position of the implement 721 under the discharge auger 752. As seen in FIG. 43, the speed target surface 754 includes speed adjustment markings 764 right and left of the speed target 756 indicating a speed adjustment distance SAD to the speed target 756, and the drive control is operated to a greater acceleration degree as the speed adjustment distance SAD increases, and to a lesser acceleration degree as the speed adjustment distance SAD decreases.

The present disclosure provides an implement operating apparatus that moves along a length wise path aligned with the side beams. Heavy implement loads can be carried by the drive frame because it is configured to resist torque forces caused by implement weights that are offset from the drive wheel paths and by turning and sloping ground. Since the implement weight is carried on the drive wheels it is not necessary to provide ballast to maintain traction of the drive wheels as is often necessary in conventional implement operating equipment. An alignment system facilitates loading and operating implements.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An implement operating apparatus comprising:
a U-shaped drive frame comprising a base beam and right and left substantially parallel side beams extending rearward from corresponding right and left portions of the base beam and defining an open implement area between the right and left side beams;
a front wheel supporting the base beam;
right and left drive wheels mounted to the corresponding right and left side beams and supporting the right and left side beams, each drive wheel rotatable about a corresponding drive wheel axis that is fixed in a substantially horizontal orientation perpendicular to an operating travel direction that is substantially aligned with the right and left side beams;
a power source mounted on the base beam and connected through a drive control to rotate the right and left drive wheels;
a steering control operative to steer the drive frame over a ground surface along an operating path oriented in the operating travel direction;
first and second implements, each implement configured to perform an implement operation and to rest on the ground surface when in an idle position;
wherein the first and second implements and the drive frame are configured such that when each implement is in the idle position, the drive frame is movable rearward with respect to each implement to an implement loading position where each implement is connectable to the drive frame and is movable to an operating position where each implement is supported by the drive frame and is connected to an implement control system operative to control implement functions;
wherein each of the first and second implements provides a beam lock connection between the right and left side beams;
wherein when each of the first and second implements is in the operating position, the beam lock connection resists twisting movement of the right and left side beams to maintain the right and left drive wheels and the right and left side beams in a substantially fixed relationship with respect to each other;
right and left twist struts fixed to the corresponding right and left side beams;
wherein the beam lock connection includes right and left twist slots coupled with implement, and wherein while moving from the idle position to the operation to the operating position the right and left twist slots engage the corresponding right and left twist struts to resist twisting movement of the right and left side beams;

wherein the first implement includes right and left wings extending laterally from the drive frame when the first implement is in the operating position and in a working configuration, and the right and left wings extend forward substantially aligned with the operating travel direction when the first implement is in a transport configuration mounted on the drive frame, and when the first implement is in the idle position; and
wherein the first implement includes right and left wing supports operative to support the corresponding right and left wings in the transport configuration and in the idle position.

2. The apparatus of claim 1 wherein the right and left side beams comprise corresponding right and left beam attachment assemblies, each beam attachment assembly fixed to the corresponding side beam and defining first and second beam attachment members that are laterally spaced from each other in directions perpendicular to the operating travel direction, and wherein the beam lock connection comprises a rigid implement portion configured to engage the first and second beam attachment members on each of the right and left beam attachment assemblies when each implement is in the operating position.

3. The apparatus of claim 2 wherein the drive frame moves rearward with respect to each implement as each implement moves from the idle position to the operating position, and as the drive frame moves rearward with respect to each implement the rigid implement portion engages the first and second laterally spaced beam attachment members and resists twisting movement of the right and left side beams by preventing lateral movement of the right and left beam attachment assemblies.

4. The apparatus of claim 3 wherein either:
the first beam attachment member on the right beam attachment assembly is provided by a pin hole and the corresponding rigid implement portion comprises a pin configured to engage the pin hole; or
the first beam attachment member on the right beam attachment assembly is provided by a pin and the rigid implement portion comprises a pin hole configured to engage the pin.

5. The apparatus of claim 2 wherein the beam attachment members are laterally spaced in directions perpendicular to the operating travel direction either vertically, or horizontally, or both vertically and horizontally.

6. The apparatus of claim 2 wherein the beam attachment members are longitudinally spaced in directions parallel to the operating travel direction either forward or rearward.

7. The apparatus of claim 1 comprising:
right and left front side bars rigidly attached at upper portions thereof to the corresponding right and left side beams, and extending downward from the corresponding right and left side beams;
right and left rear side bars rigidly attached at upper portions thereof to the corresponding right and left side beams rearward of the corresponding right and left front side bars, and extending downward from the corresponding right and left side beams;
a right wheel support rigidly attached to lower portions of the right front and rear side bars, and a left wheel support rigidly attached to lower portions of the left front and rear side bars;
wherein the right and left drive wheels are mounted to the corresponding right and left wheel supports; and
wherein the second beam attachment members of the right and left beam attachment assemblies are on lower portions of the right and left rear side bars.

8. The apparatus of claim 1 wherein, when each of the first and second implements is in the operating position, a front implement weight of each implement is supported on the front wheel and a rear implement weight of each implement is supported on the right and left drive wheels, and wherein the rear implement weight is greater than the front implement weight; and wherein the rear implement weight is supported by right and left rear bearing members attached to the corresponding right and left side beams and located on right and left bearing axes substantially aligned with the operating travel direction and substantially aligned with centers of right and left drive wheel paths.

9. The apparatus of claim 8 wherein the right and left drive wheels are mounted directly under the corresponding right and left side beams, and wherein the right and left bearing members are located on the right and left side beams.

10. The apparatus of claim 8 wherein the right and left drive wheels are mounted laterally offset from the corresponding right and left side beams outside the open implement area and wherein the right and left bearing members are rigidly fixed to the right and left side beams and extend laterally to the corresponding right and left bearing axes.

11. The apparatus of claim 1 comprising an elevation control operative to move the front wheel upward with respect to the base beam to correspondingly move rear ends of the right and left side beams upward and operative to move the front wheel downward with respect to the base beam to correspondingly move the rear ends of the right and left side beams downward.

12. The apparatus of claim 11 wherein the first implement is attached to the rear ends of the right and left side beams in a substantially fixed position relative to the side beams, such that the first implement moves upward and downward with the rear ends of the side beams, and wherein the elevation control comprises an implement height sensor operative to sense a height of the first implement, and the elevation control is operative to maintain the height of the first implement at a desired height.

13. The apparatus of claim 1 comprising right and left tracks connected to the corresponding right and left drive wheels, and wherein the steering control steers the drive frame by varying a rotational speed of the right and left drive wheels.

14. The apparatus of claim 13 comprising right and left front wheels and wherein the right and left tracks are connected to the corresponding right and left front wheels.

15. The apparatus of claim 1 comprising right and left tracks connected to the corresponding right and left drive wheels and wherein the steering control steers the drive frame by pivoting the front wheel about a substantially vertical steering axis.

16. The apparatus of claim 1 comprising right and left tires mounted to the corresponding right and left drive wheels and operative to bear against the ground surface to support the drive frame, and wherein the front wheel is connected to the base beam and the steering control steers the drive frame by pivoting the front wheel about a substantially vertical steering axis.

17. The apparatus of claim 1 wherein the first implement comprises right and left support plates configured to rest on the drive frame, and comprising right and left rollers mounted to the drive frame about substantially horizontal rotational axes oriented substantially perpendicular to the operating travel direction, and wherein when the drive frame is in the implement loading position with respect to the first implement in the idle position, the right and left rollers are under the corresponding right and left support plates and as the first implement moves toward the operating position the right and left rollers bear against the corresponding right and left support plates.

18. The apparatus of claim 17 comprising a roller drive operative to selectively rotate the right and left support rollers in forward and reverse directions.

19. The apparatus of claim 1, wherein the right and left wings are above the right and left side beams, and inside outer edges of the drive frame and drive wheels when in the transport configuration and mounted on the drive frame.

20. The apparatus of claim 1 comprising:

right and left rub faces along right and left sides of the drive frame;

right and left rub guides mounted on each implement; and wherein the rub faces and rub guides are configured such that when the drive frame is maneuvered to the implement loading position with respect to each implement in the idle position, a forward portion of each implement moves into the open implement area between the right and left side beams and the right and left rub guides contact the corresponding right and left rub faces to guide each implement to the operating position.

21. The apparatus of claim 20 wherein each right and left rub guide comprises a guide surface at a front end thereof that slopes inward away from the corresponding right and left side beams.

22. The apparatus of claim 20 comprising right and left front rub guides on a forward portion of each implement and right and left rear rub guides located on each implement rearward of the corresponding right and left front rub guides.

23. The apparatus of claim 1 wherein the right and left side beams slope downward from the base beam at a beam angle, and wherein the first and second implements comprise right and left load points along a load line sloping downward from the forward portion of each implement at an angle substantially the same as the beam angle, and when the drive frame is maneuvered to the implement loading position with respect to each implement in the idle position the side beams move under the load points.

24. The apparatus of claim 23 wherein the right and left drive wheels are mounted laterally offset from the corresponding right and left side beams outside the open implement area, and wherein the right and left drive wheels extend above the corresponding right and left side beams.

25. The apparatus of claim 23 wherein the right and left drive wheels are mounted directly under the corresponding right and left side beams, and comprising right and left tracks connected to the corresponding right and left rear drive wheels.

26. An implement operating apparatus comprising:

a U-shaped drive frame comprising a base beam and right and left substantially parallel side beams extending rearward and sloping downward from corresponding right and left portions of the base beam and defining an open implement area between the right and left side beams;

a front wheel supporting the base beam;

right and left drive wheels mounted to the corresponding right and left side beams and supporting the right and left side beams, each drive wheel rotatable about a corresponding drive wheel axis that is fixed in a substantially horizontal orientation perpendicular to an operating travel direction that is substantially aligned with the right and left side beams;

a power source mounted on the drive frame and connected through a drive control to rotate the right and left drive wheels;

a steering control operative to steer the drive frame over a ground surface along an operating path oriented in the operating travel direction;

first and second implements, each implement configured to perform an implement operation and to rest on the ground surface when in an idle position, wherein the first and second implements comprise a front implement load support and right and left rear implement load supports;

wherein the first and second implements and the drive frame are configured such that when each implement is in the idle position, the drive frame is movable rearward with respect to each implement to an implement loading position where each implement is connectable to the drive frame and is movable to an operating position where each implement is supported on the front implement load support and on the right and left rear implement load supports by a corresponding front bearing member mounted to the drive frame and corresponding right and left rear bearing members attached to the corresponding right and left side beams and where each implement is connected to an implement control system operative to control implement functions; and wherein a rear implement weight carried on the right and left rear bearing members is at least twice as much as a front implement weight carried on the front bearing member.

27. The apparatus of claim 26 wherein the right and left drive wheels are mounted laterally offset from the corresponding right and left side beams outside the open implement area, and wherein the right and left drive wheels extend above the corresponding right and left side beams such that the drive wheel axis is in proximity to the right and left side beams.

28. The apparatus of claim 27 wherein the right and left rear bearing members are located rearward of the corresponding right and left drive wheels and substantially in alignment with centers of corresponding right and left drive wheel paths.

29. The apparatus of claim 28 wherein when the drive frame is in the implement loading position, right and left loading arms on the drive frame engage the corresponding right and left rear implement load supports of the first implement and a load control is operative to move the loading arm to raise a rear portion of the first implement from the idle position to the operating position.

30. The apparatus of claim 29 comprising right and left beam attachment assemblies fixed to rear ends of the corresponding right and left side beams, and wherein right and left loading arms are mounted to the corresponding right and left beam attachment assemblies, and wherein the right and left rear bearing members are provided by the right and left loading arms.

31. The apparatus of claim 30 wherein each beam attachment assembly defines first and second beam attachment members that are laterally spaced from each other in directions perpendicular to the operating travel direction, and wherein each implement comprises a rigid implement portion configured to engage the first and second beam attachment members on each of the right and left beam attachment assemblies when each implement is in the operating position.

32. The apparatus of claim 31 comprising an elevation control operative to selectively move the front wheel upward and downward with respect to the base beam and wherein the front wheel is moved upward to lower the base beam while the drive frame is moved rearward to the implement loading position, and the front wheel is moved downward to raise the base beam and force the front bearing member upward to bear against the corresponding front implement load support and raise a front portion of each implement above the ground to the operating position.

33. The apparatus of claim 32 wherein the first implement is attached to the rear ends of the right and left side beams in a substantially fixed position relative to the side beams, such that the first implement moves upward and downward with the rear ends of the side beams, and wherein the elevation control comprises an implement height sensor operative to sense a height of the first implement, and the elevation control is operative to maintain the height of the first implement at a desired height.

34. The apparatus of claim 26 comprising:

right and left rub faces along inner faces of the corresponding right and left side beams;

right and left rub guides mounted on each implement;

wherein when the drive frame is maneuvered to the implement loading position with respect to each implement in the idle position, a forward portion of each implement moves into the open implement area between the right and left side beams and the right and left rub guides contact the corresponding right and left rub faces to guide each implement to an operating position supported by the drive frame and connected to an implement control system operative to control implement functions.

35. The apparatus of claim 34 comprising right and left front rub guides on a forward portion of each implement and right and left rear rub guides located on each implement rearward of the corresponding right and left front rub guides.

36. The apparatus of claim 35 wherein the right and left front rub guides are provided by front legs operative to support each implement in the idle position.

37. The apparatus of claim 26 comprising a substantially horizontally oriented platform mounted on a raising assembly forward of the base beam, and a platform control operative to selectively move the platform from a lowered position in proximity to the ground surface to a raised position.

* * * * *